(12) United States Patent
Cai et al.

(10) Patent No.: US 10,838,056 B1
(45) Date of Patent: Nov. 17, 2020

(54) DETECTION OF TARGET

(71) Applicant: NEXTVPU (SHANGHAI) CO., LTD., Shanghai (CN)

(72) Inventors: Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/834,957

(22) Filed: Mar. 30, 2020

Related U.S. Application Data

(63) Continuation of application No. PCT/CN2020/076152, filed on Feb. 21, 2020.

(30) Foreign Application Priority Data

Dec. 25, 2019 (CN) .......................... 2019 1 1353328

(51) Int. Cl.
*G01S 13/50* (2006.01)
*G06T 7/73* (2017.01)
*G06K 9/32* (2006.01)
*G06K 9/52* (2006.01)
*G06K 9/00* (2006.01)
(Continued)

(52) U.S. Cl.
CPC ............ *G01S 13/50* (2013.01); *G06K 9/3241* (2013.01); *G06K 9/52* (2013.01); *G06T 7/73* (2017.01); *G06K 9/00208* (2013.01); *G06K 9/00228* (2013.01); *G06K 9/00369* (2013.01); (Continued)

(58) Field of Classification Search
CPC ................ B60R 1/00; B60R 2300/802; B60R 2001/1253; B60R 2300/101; H04N 7/181; H04N 5/247; H04N 5/23296; H04N 13/246; H04N 13/366; G06T 7/70; G06T 2207/10016; G06T 7/80; G06T 2207/30244; G06T 7/20; G06K 9/00711; G06K 9/3241; G06K 9/00228; G06K 9/00288; G06K 9/00335; G06K 9/00362; G06K 2009/00738; G06K 9/00268; G06K 9/00369; G06K 9/00744; G06K 2209/21; G06K 9/00013; G02B 2027/0138; G06F 3/017
See application file for complete search history.

(56) References Cited

U.S. PATENT DOCUMENTS

2012/0281874 A1 11/2012 Lure
2019/0135294 A1* 5/2019 Sato .................. G06K 9/32
2020/0120268 A1* 4/2020 Osawa ............... H04N 5/23216

FOREIGN PATENT DOCUMENTS

CN 103813075 A 5/2014
CN 104253938 A 12/2014
(Continued)

*Primary Examiner* — Olumide Ajibade Akonai
(74) *Attorney, Agent, or Firm* — Kilpatrick Townsend & Stockton LLP

(57) ABSTRACT

Provided are a target detection method, a circuit, a device for assisting visually impaired people, an electronic device, and a medium. The target detection method includes: acquiring an image collected by an image sensor; detecting whether there is at least a portion of a target object in the image; and providing, in response to not detecting at least a portion of the target object in the image, a prompt to adjust the target object to be within a field of view of the image sensor.

19 Claims, 19 Drawing Sheets

(51) Int. Cl.
*G06T 7/80* (2017.01)
*G06K 9/46* (2006.01)

(52) U.S. Cl.
CPC ....... *G06K 9/00771* (2013.01); *G06K 9/4604* (2013.01); *G06T 7/80* (2017.01)

(56) References Cited

FOREIGN PATENT DOCUMENTS

| | | | |
|---|---|---|---|
| CN | 106506959 | A | 3/2017 |
| CN | 107404721 | A | 11/2017 |
| CN | 109255314 | A | 1/2019 |
| CN | 109361865 | A | 2/2019 |
| JP | 2005202533 | A | 7/2005 |
| JP | 2012065247 | A | 3/2012 |
| JP | 2019087945 | A | 6/2019 |
| JP | 2019124864 | A | 7/2019 |
| JP | 2020014123 | A | 1/2020 |

\* cited by examiner

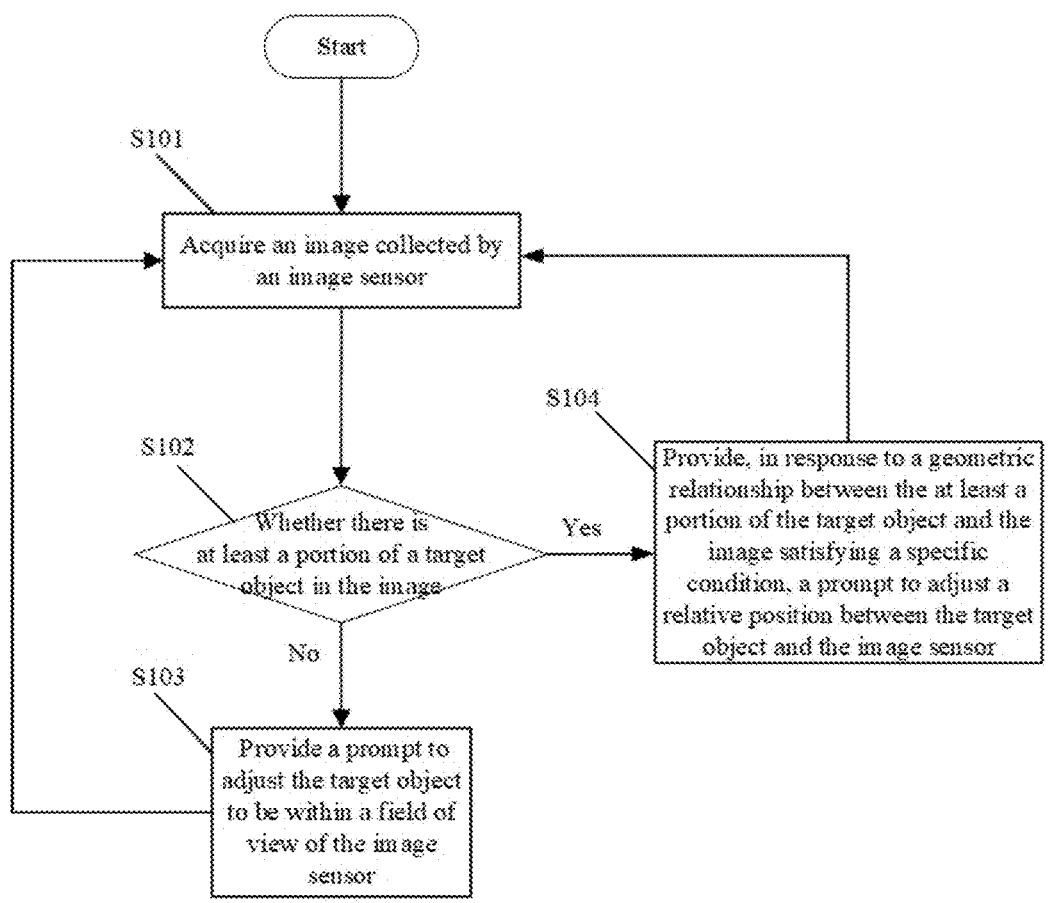
Fig. 1
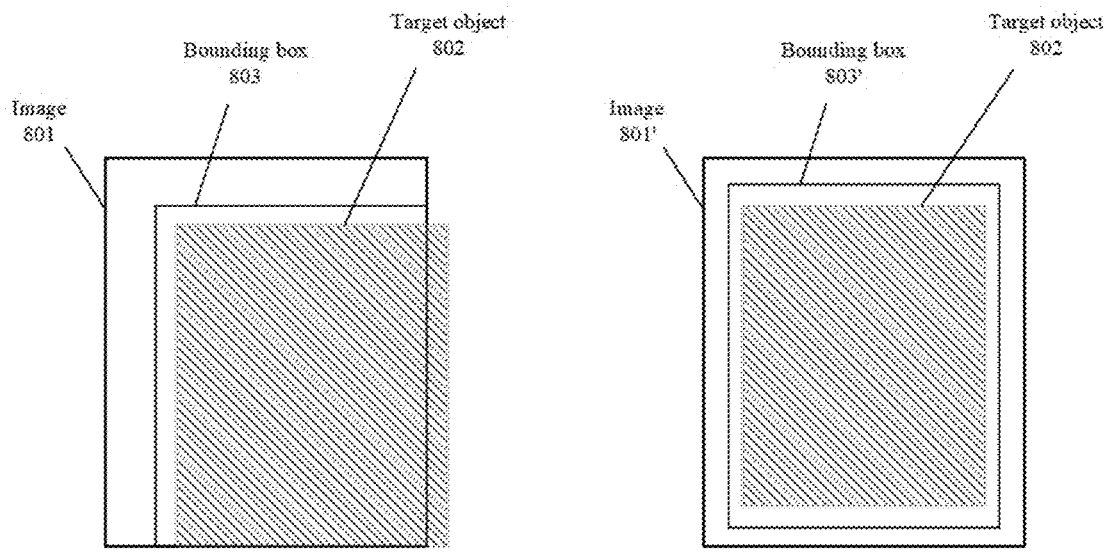
Fig. 2A                    Fig. 2B

DETECTION OF TARGET

CROSS-REFERENCES TO RELATED APPLICATIONS

This application claims priority to and is a continuation of International Patent Application No. PCT/CN2020/076152, filed Feb. 21, 2020, which claims priority from Chinese Patent Application No. CN 201911353328.0 filed Dec. 25, 2019. The entire contents of the PCT/CN2020/076152 and CN 201911353328.0 are incorporated by reference herein in their entirety for all purposes.

TECHNICAL FIELD

The present disclosure relates to the field of image processing, and in particular to a target detection method, an electronic circuit, a device for assisting visually impaired people, an electronic device, and a computer-readable storage medium.

BACKGROUND OF THE INVENTION

In recent years, the target detection technology has been widely applied in various fields, and has been one of the focuses of attention in the industry.

Methods described in this section are not necessarily the methods that have been previously conceived or employed. Unless otherwise expressly indicated, it should not be assumed that any of the methods described in this section are considered to be the prior art just because they are included in this section. Similarly, the problems mentioned in this section should not be considered to be universally recognized in any prior art, unless otherwise indicated expressly.

BRIEF SUMMARY OF THE INVENTION

According to an aspect of the present disclosure, a target detection method is provided, including: acquiring an image collected by an image sensor; detecting whether there is at least a portion of a target object in the image; and providing, in response to not detecting at least a portion of the target object in the image, a prompt to adjust the target object to be within a field of view of the image sensor.

According to another aspect of the present disclosure, an electronic circuit is provided, including: a circuit configured to perform the operations of the method described above.

According to another aspect of the present disclosure, a device for assisting visually impaired people is further provided, including: an image sensor configured to collect an image; and an electronic circuit configured to detect whether there is at least a portion of a target object in the image, wherein the electronic circuit is further configured to provide, in response to not detecting at least a portion of the target object in the image, a prompt to adjust the target object to be within a field of view of the image sensor.

According to another aspect of the present disclosure, an electronic device is further provided, including: a processor; and a memory that stores a program, the program including instructions that, when executed by the processor, cause the processor to perform the methods described above.

According to another aspect of the present disclosure, a non-transitory computer-readable storage medium that stores a program is further provided, the program including instructions that, when executed by a processor of an electronic device, cause the electronic device to perform the method described above.

BRIEF DESCRIPTION OF THE DRAWINGS

The accompanying drawings exemplarily show embodiments and constitute a part of the specification for interpreting exemplary implementations of the embodiments, together with the description in the specification. The embodiments shown are merely for illustrative purposes and do not limit the scope of claims. In all the figures, the same reference signs refer to similar but not necessarily identical elements.

FIG. 1 is a flow chart showing a target detection method according to an exemplary embodiment of the present disclosure.

FIG. 2A shows a schematic diagram of a bounding box containing a portion of a target object and detected in an image, and FIG. 2B shows a schematic diagram of a bounding box containing an entire target object and detected in an image.

DETAILED DESCRIPTION OF THE INVENTION

Figure 3:
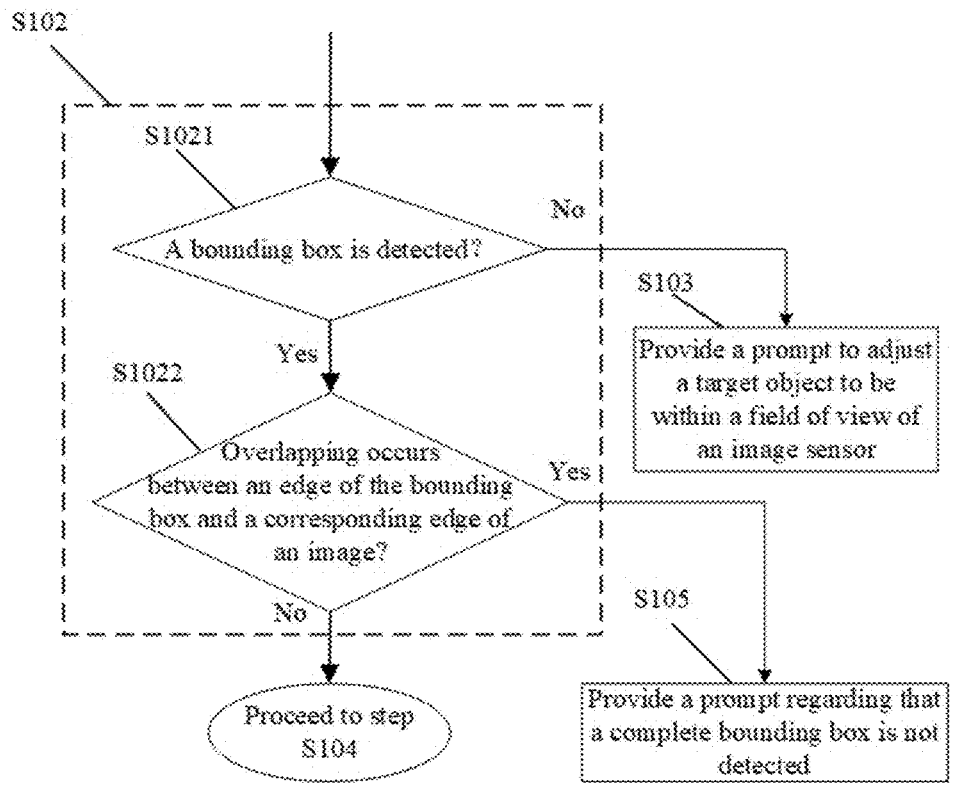
FIG. 3 shows a schematic diagram of an exemplary process for detecting whether there is at least a portion of a target object in an image.

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

In the case where a preview image is not provided (for example, a wearable device without a display screen) or the preview image is not visible (for example, to a visually impaired user), there may be a case where an image sensor is misaligned with a target object, and such misalignment causes a problem in the recognition of the target object. For example, in the case where text is contained in the target object, such misalignment causes a problem in the recognition of the text.

The present disclosure provides a target detection method. FIG. 1 is a flow chart showing a target detection method according to an exemplary embodiment of the present disclosure.

As shown in FIG. 1, the target detection method according to the exemplary embodiment of the present disclosure includes: step S101 of acquiring an image collected by an image sensor; step S102 of detecting whether there is at least a portion of a target object in the image; and step S103 of providing, in response to not detecting at least a portion of the target object in the image, a prompt to adjust the target object to be within a field of view of the image sensor.

In step S101, the image collected by the image sensor is acquired so as to subsequently detect whether there is at least a portion of the target object in the image.

According to some embodiments, the image sensor for collecting an image can statically or dynamically collect an image, which may be a stand-alone apparatus (for example, a camera, a video camera, a webcam, etc.) or may be contained in various electronic devices (for example, a mobile phone, a computer, a personal digital assistant, a device for assisting visually impaired people, a tablet computer, a reading assisting device, a wearable device, etc.).

According to some embodiments, in this step, the image collected by the image sensor may be a preview image, and not necessarily be a capture image.

According to some embodiments, the image sensor may be provided on a device of a user such as a wearable device, reading assisting glasses, and a hand-held device, so that the acquired image may be, for example, an image of a target object collected by the image sensor provided on the wearable device or the reading assisting glasses.

According to some embodiments, the target object may be an object placed somewhere, or may be an object held in a user's hand or supported by the user, etc.

According to some embodiments, the target object may have a regular shape or may have an irregular shape.

According to some embodiments, the target object may not be fixed, for example, can be moved by a user, or can be moved by a moving apparatus for moving the target object. For example, a movable target object may be: an ID card, a business card, a passport, a driver's license, a reading material, a tablet computer, a mobile phone, etc.; and the target object itself can even move, for example, the target object being a vehicle, etc. According to some embodiments, the target object may also be immovable, for example, the target object being a wall-mounted television, a fixed bulletin board, etc.

According to some embodiments, the target object may include, for example, various forms of text, numbers, characters, symbols, pictures, etc.

According to some embodiments, the acquired image may be an image collected directly by an image sensor, or may be an image that has undergone an item or some items of pre-processing based on the image acquired by the image sensor, wherein the processing may include, for example, denoising, contrast enhancement, resolution processing, etc.

According to some embodiments, the image may be acquired from the image sensor in real time, or may be acquired a period of time after the image is acquired by the image sensor.

According to some embodiments, the acquired image may be a pre-screened image, for example, a relatively clear image that is selected from images obtained after a plurality of collections.

In step S102, after the image is acquired, it is detected whether there is at least a portion of the target object in the image.

According to some embodiments, whether there is at least a portion of the target object in the image may be determined by performing a bounding box detection on the image. For example, in response to not detecting a bounding box in the image, it may be determined that at least a portion of the target object is not detected in the image, and in response to detecting the bounding box in the image, it may be determined that at least a portion of the target object is detected in the image.

According to some embodiments, the bounding box of the target object may be detected using a target detection algorithm (for example, R-CNN, Fast R-CNN, RFCN, etc.).

In the target detection algorithm, after it is detected that there is at least a portion of the target object in the image, parameters for representing the position of a corresponding bounding box may be output, and such parameters may include information of coordinates of the center, the width, the height, etc. of the bounding box. In this way, coordinates of each vertex of the bounding box can be acquired from the obtained information of the coordinates of the center, the width, the height, etc. of the bounding box to obtain the corresponding bounding box. It is noted that the parameters for representing the position of the bounding box may further include other combinations of parameters capable of representing positional information, and are not limited to the examples given herein. In fact, the parameters for representing the position may be selected according to specific requirements of target detection.

According to some embodiments, the bounding box detection of the target object may be further performed by using other detection ways for determining the bounding box based on the position of the target object.

As shown in FIG. 1, in response to not detecting at least a portion of the target object in the image, step S103 may be performed to provide the prompt to adjust the target object to be within the field of view of the image sensor.

It can be seen therefrom that, in the present disclosure, it is possible to first determine whether there is a case where at least a portion of the target object cannot be detected (for example, a case where the bounding box cannot be detected) to automatically determine the image quality, and if it is determined that there is such a case, a prompt suitable for a user will be further automatically given (for example, the prompt to adjust the target object to be within the field of view of the image sensor) to help the user to quickly adjust the relative position between the target object and the image sensor, so as to more quickly obtain an image that satisfies quality requirements (for example, whether the position and/or the size of the target object in the image are suitable), thereby effectively saving processing resources and greatly shortening the processing time.

According to some implementations, the target detection method, and the related circuit, device, etc. of the present disclosure can be used for a device for assisting visually impaired people and a wearable device, which, in the case where it is difficult for a visually impaired user to visually determine the image quality or the wearable device worn by the user is not provided with a display screen, can automatically help the user to pre-determine the image quality and can further automatically prompt the user, so as to obtain an image with a better quality and help the user to more quickly obtain a desired service (for example, a reading service, a guide service, etc.).

According to some embodiments, in step S103, providing the prompt to adjust the target object to be within the field of view of the image sensor may include: providing, in response to the image sensor being a device with a fixed position, a prompt to move the target object to bring the target object into the field of view of the image sensor; and providing, in response to the image sensor being a device with an adjustable position, a prompt to move the target object and/or the image sensor to bring the target object into the field of view of the image sensor.

For example, assuming that the image sensor is installed in a device such as a desktop device for assisting visually impaired people that has a relatively fixed position, that is, the position of the image sensor is relatively fixed, it is possible to provide the prompt to move the target object to bring the target object into the field of view of the image sensor, thereby facilitating a user's operation and improving the user's usage experience. Assuming that the image sensor is installed in a device such as a hand-held device for assisting visually impaired people or a wearable device for assisting visually impaired people that has a relatively flexibly adjustable position, that is, the position of the image sensor is relatively flexibly adjustable, it is possible to provide not only the prompt to move the target object to bring the target object into the field of view of the image sensor, but also a prompt to move the image sensor to bring the target object into the field of view of the image sensor, thereby increasing the flexibility of a user's operation and improving the user's usage experience.

According to some embodiments, in step S103, in addition to providing the prompt to adjust the target object to be within the field of view of the image sensor, a prompt regarding that at least a portion of the target object is not detected may also be provided. According to the abovementioned related description, whether there is at least a portion of the target object in the image may be determined by performing the bounding box detection on the image, and therefore, the prompt regarding that at least a portion of the target object is not detected may include a prompt regarding that "a bounding box is not detected", "a bounding box containing at least a portion of the target object is not detected", or "it is determined that a bounding box containing at least a portion of the target object does not exist in the image", etc.

According to some embodiments, providing the prompt to move the target object may include providing a prompt to move the target object so as to cause the target object to get less close (i.e. get farther from the image sensor) and/or be shifted, and providing the prompt to move the image sensor may include providing a prompt to move the image sensor (for example, move the image sensor itself, or move a device where the image sensor is located so as to move the image sensor) so as to cause the image sensor to get less close (i.e. get farther from the target object) and/or be shifted. Since it is possible to determine that at least a portion of the target object is not detected in the image by determining that the bounding box cannot be detected, and the bounding box cannot be detected possibly because the target object is too close to or somewhat deviated from the position of a viewfinder frame (or the field of view) of the image sensor, the target object can be brought into the field of view of the image sensor as much as possible by moving the target object (and/or the image sensor) so as to cause the target object to get less close and/or be shifted. In addition, it is worth noting that the field of view of the image sensor is close to but different from the field of view of a user. In comparison, adjusting the target object to be within the field of view of the image sensor makes a result of target detection more accurate than adjusting the target object to be within the field of view of the corresponding user.

As described above, in the case where the bounding box cannot be detected, thereby determining that at least a portion of the target object is not detected in the image, it is possible to adjust the distance between the target object and the image sensor to enable the target object to enter the field of view of the viewfinder frame as much as possible, or to adjust the orientation (up, down, left, and right orientations) of the target object and/or the image sensor to enable the target object to enter the field of view of the viewfinder frame as much as possible (certainly, it is possible that the adjustment being performed in dimensions of both the distance and the orientation).

According to some embodiments, in the case where the bounding box cannot be detected, thereby determining that at least a portion of the target object is not detected in the image, the distance of the target object from the image sensor may preferably be adjusted.

According to some embodiments, as shown in FIG. 1, the method may further include step S104: determining, in response to detecting at least a portion of the target object in the image, whether a geometric relationship between the at least a portion of the target object and the image satisfies a specific condition; and providing, in response to the geometric relationship between the at least a portion of the target object and the image satisfying the specific condition, a prompt to adjust a relative position between the target object and the image sensor such that the target object is located in an appropriate position within the field of view of the image sensor.

As mentioned above, in response to detecting a bounding box in the image, it may be determined that at least a portion of the target object can be detected in the image. According to some embodiments, the detected bounding box may be a bounding box containing a portion of the target object, or a bounding box containing the entire target object.

For example, FIG. 2A shows a bounding box 803 (incomplete bounding box) detected in an image 801 and containing a portion of a target object 802, and FIG. 2B shows a bounding box 803' (complete bounding box) detected in an image 801' and containing the entire target object 802.

The bounding box of the target object that is detected in the image surrounds at least the target object collected in the image (the image may contain the entire target object or may contain only a portion of the target object), that is, the bounding box of the target object surrounds at least a real border frame formed by the actual outline of the target object in the image.

Although the bounding box 803 shown in FIG. 2A surrounds not only a portion of the target object 802, but also a region other than the collected target object 802, the bounding box 803 may also coincide (substantially coincide) with the real outline of that portion of the collected target object 802, and the bounding box in this case is the smallest bounding box surrounding the real outline of that portion of the target object 802. Similarly, although the complete bounding box 803' shown in FIG. 2B surrounds not only the entire target object 802, but also a region other than the target object 802, the complete bounding box 803' may also coincide (substantially coincide) with the entire real outline of the target object 802, and the complete bounding box in this case is the smallest bounding box surrounding the entire real outline of the target object 802.

In other words, the "bounding box" described herein may mean that the at least a portion (that is, either all or a portion) of the target object is contained in the bounding box; and the "complete bounding box" may mean that the entire target object is contained in the bounding box. If a bounding box is not detected, it belongs to "a bounding box containing at least a portion of the target object is not detected" or "it is determined that a bounding box containing at least a portion of the target object does not exist in the image". If a portion of the target object instead of the entire target object is collected in the image, resulting in that the complete bounding box of the target object cannot be detected in the image, it belongs to the case where the bounding box is detected, but "the complete bounding box containing the entire target object is not detected" or "it is determined that the complete bounding box containing the entire target object does not exist in the image".

According to some embodiments, in response to detecting at least a portion of the target object in the image, it is also possible to further determine whether the detected at least a portion of the target object contains the entire target object, that is, whether the complete target object can be detected. For example, after detecting the bounding box of the target object (that is, determining that there is at least a portion of the target object in the image), it is then detected whether the bounding box belongs to the complete bounding box, that is, whether the bounding box contains the entire target object so as to determine whether the complete target object can be detected.

For example, as shown in FIG. 3, the "detecting whether there is at least a portion of a target object in the image" in step S102 may include, for example, steps S1021 and S1022.

In step S1021, it is detected whether there is a bounding box containing at least a portion of the target object in the image.

As mentioned above, the bounding box of the target object may be detected using a target detection algorithm (for example, R-CNN, Fast R-CNN, RFCN, etc.). In the target detection algorithm, after the target object in the image is detected, parameters for representing the position of the bounding box may be output, and such parameters may include information of coordinates of the center, the width, and the height of the bounding box. In this way, coordinates of each vertex of the bounding box can be acquired from the obtained information of the coordinates of the center, the width, and the height of the bounding box.

According to some embodiments, the detected bounding box of the target object may be a rectangular box, as shown in FIGS. 2A and 2B. In this case, the rectangular box may be, for example, determined by the positions of four vertices.

According to some embodiments, the detected bounding box of the target object may also be in a shape other than a rectangle, for example, another regular shape such as a circle, a polygon, or an ellipse, or a respective one of various irregular shapes. The present disclosure imposes no limitation on the shape of the bounding box.

According to some embodiments, if the bounding box is not detected in the image in step S1021 (that is, it is determined that at least a portion of the target object is not detected in the image), proceed to step S103, so as to provide the prompt to adjust the target object to be within the field of view of the image sensor. In addition, it is also possible to provide a prompt regarding that the bounding box is not detected. The prompt regarding that the bounding box is not detected is one of prompts regarding that at least a portion of the target object is not detected.

If the bounding box is detected in the image in step S1021, proceed to step S1022, so as to determine whether the detected bounding box is a complete bounding box containing the entire target object by detecting whether overlapping occurs between an edge of the bounding box and a corresponding edge of the image, thereby determining whether the complete target object can be detected.

If overlapping occurs ("Yes") between the edge of the bounding box and the corresponding edge of the image, it may be determined that the detected bounding box is not a complete bounding box (that is, the complete target object cannot be detected). In this case, it is possible to proceed to step S105 to provide a prompt regarding that the complete bounding box is not detected. The prompt regarding that the complete bounding box is not detected is one of prompts regarding that the complete target object is not detected.

There being an overlap between the edge of the bounding box and the corresponding edge of the image may be there being an overlap between at least a portion of at least one edge of the bounding box and at least a portion of a corresponding edge of the image. That is, it is not necessary that an overlap on the entire edge counts as an overlap, but that an overlap occurring on a portion of the edge (instead of an overlap on the entire edge) also counts as an overlap. Therefore, the overlap on the entire edge belongs to the case where the complete bounding box cannot be detected, and the overlap occurring on a portion of the edge also belongs to the case where the complete bounding box cannot be detected.

As described above, in the present disclosure, it is also possible to further determine, after determining that the bounding box of the target object is detected, whether the bounding box of the target object that is detected in the image is a complete bounding box, that is, whether the image contains the complete target object, or whether the bounding box detected in the image can surround the entire target object.

For example, for an object used as the target object, such as a regularly-shaped ID card and reading materials (paper medium materials such as a book or a magazine, or an electronic reading material such as an e-book), it is possible to detect whether the outline of the object photographed in the image is exposed. If the target object is a physical book of a paper medium, it is possible to detect whether an edge of this physical book is contained in the bounding box. For example, with reference to FIG. 2B, the complete bounding box 803' is detected in the image 801', and the complete bounding box 803' surrounds each real edge of the target object 802. For an irregularly-shaped target object, similar detection may be performed, that is, determining whether the bounding box detected in the image contains the complete target object, for example, by determining whether the detected bounding box contains the outline of the target object.

As described above, in step S1022, whether the detected bounding box is a complete bounding box containing the entire target object may be determined, for example, by detecting whether overlapping occurs between the edge of the bounding box and the corresponding edge of the image, thereby determining whether the detected at least a portion of the target object contains the entire target object.

If the edge of the bounding box at least partially overlaps with the corresponding edge of the image (one or some of the distances between the edges is equal to 0), the prompt regarding that the complete bounding box is not detected may be provided in step S105.

It is noted that the prompt regarding that "the complete bounding box is not detected" is provided here, which is different from the prompt regarding that "the bounding box is not detected" described previously.

If there is no overlap between the edge of the bounding box and the corresponding edge of the image (indicating that the complete bounding box is detected), it is possible to proceed to step S104.

For ease of understanding and convenience of description, this will be described below by taking a case where the detected bounding box is a rectangular box as an example.

As shown in FIGS. 5A to 5F, FIGS. 5A and 5B are cases where edges of a detected bounding box completely overlap with corresponding edges of the image, and FIGS. 5C, 5D, 5E, and 5F are cases where edges of a detected bounding box partially overlap with corresponding edges of the image.

Here, providing the prompt regarding that the complete bounding box is not detected includes making a prompt to adjust a relative position between the target object and the image sensor so as to cause the target object to get less close (i.e. get farther from the image sensor) and/or be shifted.

Here, causing the target object to get less close and/or be shifted includes, for example, moving the target object so as to cause the target object to get less close (e.g. be put farther away) and/or be shifted, for example, putting the target object farther away and/or shifting same with respect to a viewfinder frame of the image sensor; or moving the image sensor (for example, moving the image sensor itself or moving a device where the image sensor is located, such as a wearable device or a reading device for the visually impaired, to move the image sensor) so as to cause the image sensor to get farther from and/or be shifted from the target object; or moving both the target object and the image sensor to cause the target object to get less close and/or be shifted. That is, the relative position between the target object and the image sensor may be adjusted by adjusting the position of the target object, adjusting the position of the image sensor, or even adjusting the positions of the both the target object and the image sensor.

Figure 5A:
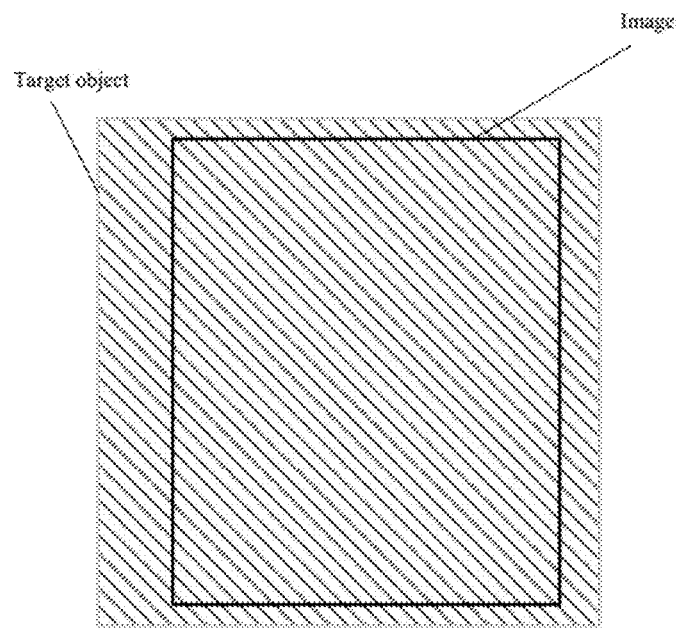
FIGS. 5A, 5B, 5C, 5D, 5E and 5F show example cases where an edge(s) of a bounding box overlaps with an edge(s) of an image.
Figure 5B:
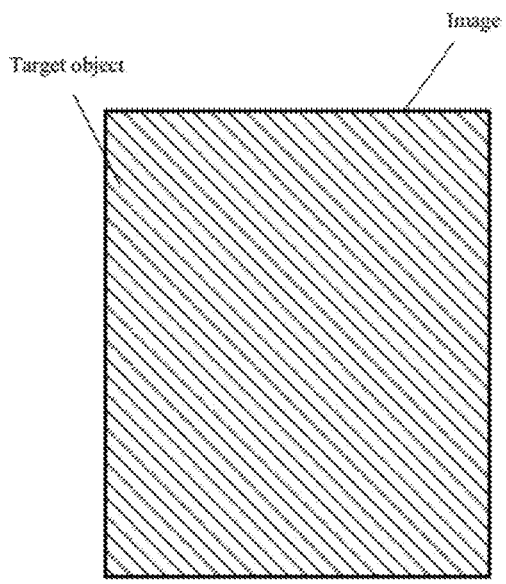
Figure 5C:
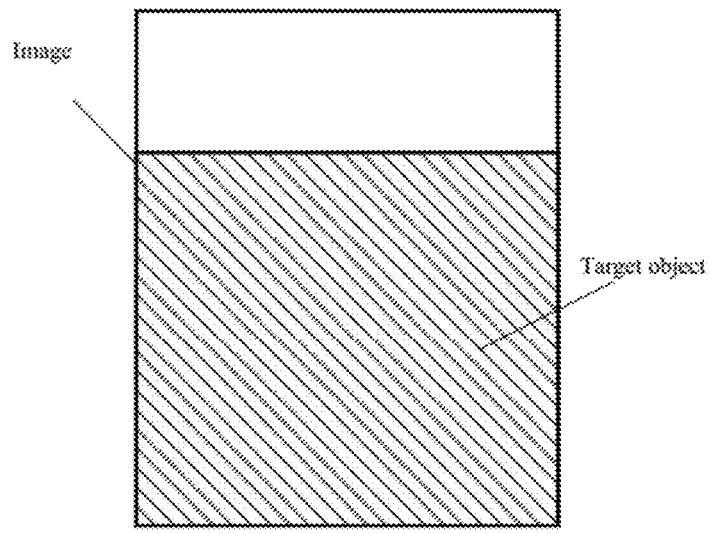
Figure 5D:
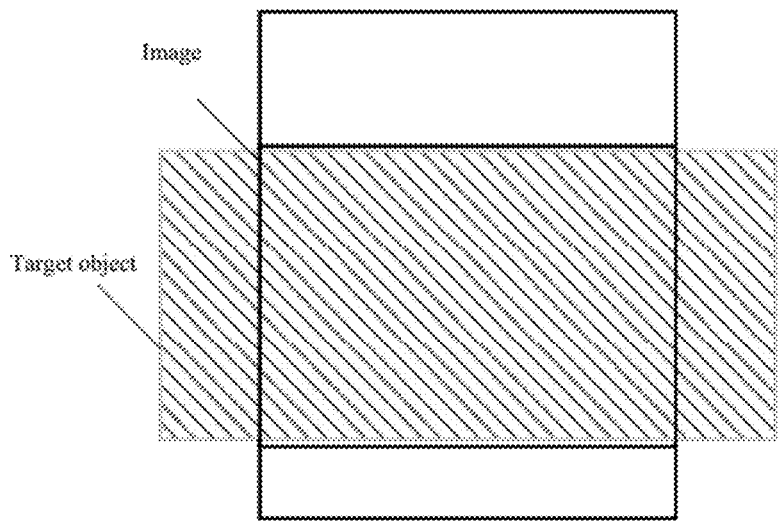

For example, as shown in FIG. 5A, if the detected rectangular box overlaps with the image on four edges, it indicates that a portion of the target object is beyond the field of view of the viewfinder frame and thus the target object is not completely collected. Alternatively, as shown in FIG. 5B, it indicates that the target object is just in and completely collected by the field of view of the viewfinder frame but the target object is too large in the image, in this case of overlapping on four edges, it is possible to directly make a prompt to cause the target object to get less close such that the target object enters the field of view of the viewfinder frame as much as possible.

Figure 5E:
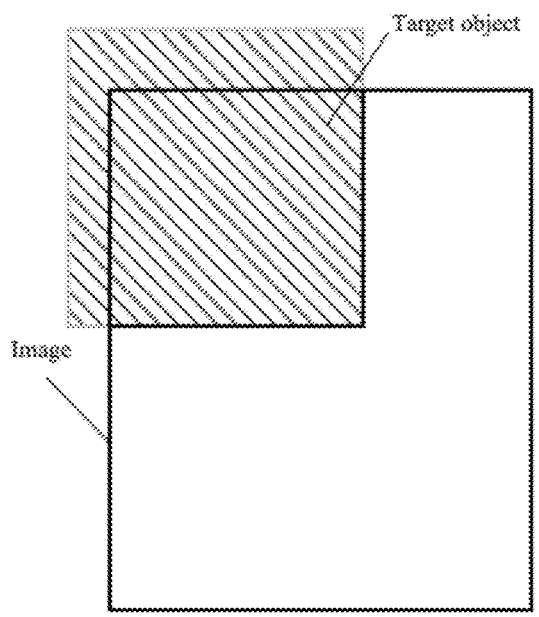
Figure 5F:
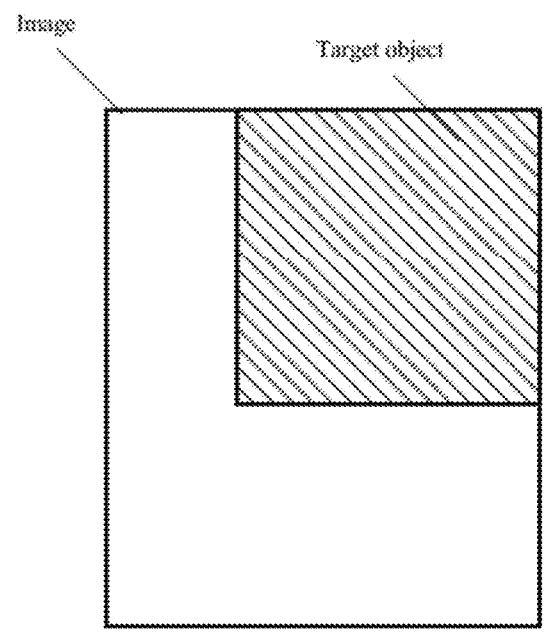

If the detected rectangular box overlaps with the image on three edges or two edges, as shown in FIGS. 5C, 5D, 5E and 5F, it indicates that the target object may not be completely collected, and it is possible to directly make a prompt to cause the target object to get less close (for example, overlapping occurs on three edges in FIG. 5C and overlapping occurs on two edges in FIG. 5D), and/or to move the target object in a direction related to an orientation, which is determined by an orientation opposite to an orientation of an edge of the bounding box that overlaps with an edge of the image (for example, as shown in FIG. 5E, two edges of the bounding box overlap with two edges of the image respectively in an upper left direction, the target object then may be moved in a lower right direction opposite to the upper left direction) or by an orientation opposite to an orientation of a center position of the bounding box corresponding to the target object relative to a center position or a central region of the image (for example, as shown in FIG. 5F, two edges of the bounding box overlap with two edges of the image respectively in an upper right direction, and the center position of the bounding box is somewhat in an upper right direction relative to the center position of the image, the target object then may be moved in a lower left direction opposite to the upper right direction).

When the detected bounding box completely overlaps with a border frame of the image, that is, when the distances between the respective edges of the detected bounding box and the corresponding edges of the image are all equal to 0, such a case is considered as not detecting a complete bounding box in the above example. However, for this particular case where the detected bounding box completely overlaps with the border frame of the image, it may also be considered as detecting a complete bounding box, that is, the present disclosure is not limited to considering such as case as not detecting the complete bounding box, and whether the bounding box completely overlapping with the border frame of the image is used as a complete bounding box or not may be determined depending on actual demands.

For image recognition, the bounding box of the target object completely overlapping with the border frame of the image may affect the image recognition effect in the vicinity of the edge of the image, because the definition of the edge portion of the image collected by the current image sensor is relatively low. Therefore, when the collected target object is close to the center of the image, the recognition effect is better. Therefore, by setting a specific distance threshold, the obtained bounding box can be made smaller than the border frame of the image, whereby the target object in the obtained bounding box can be complete and can be centered in the image as much as possible. In addition, some exemplary implementations of obtaining a target object that is complete, appropriately sized, and centered as much as possible by further using other ways or by further setting a distance range parameter related to a distance between an edge of the bounding box of the target object and an edge of the image will be further described later.

By automatically giving different prompts regarding various related cases to a user as described above, it is possible to help the user to quickly adjust the relative position between the target object and the image sensor, so as to more quickly obtain an image that satisfies the quality requirements (for example, whether the position and/or the size of the target object in the image are suitable), thereby effectively saving the processing resources and greatly shortening the processing time.

According to some embodiments of the present disclosure, as shown in FIG. 1, after providing the prompt to adjust the target object to be within the field of view of the image sensor in step S103, it is possible to proceed to step S101 to reacquire an image re-collected by the image sensor and continue to detect whether there is at least a portion of the target object in the reacquired image in step S102 (more particularly, in step S1021 in FIG. 3) until at least a portion of the target object is detected in the reacquired image.

For example, in the case of determining that "the bounding box is not detected" or further "the complete bounding box is not detected" through an automatic determination, as described above, according to some embodiments, a prompt will be automatically provided to the user to help the user to quickly adjust the relative position between the target object and the image sensor, so as to more quickly obtain an image that satisfies quality requirements (for example, whether the position and/or the size of the target object in the image are suitable), thereby effectively saving the processing resources and greatly shortening the processing time.

According to some implementations, the target detection method, and the related circuit, device, etc. of the present disclosure can be used for a device for assisting visually impaired people, a wearable device, etc., for example, in the case where a visually impaired user or a user wearing a wearable device that is not provided with a display screen cannot determine the image quality, in an exemplary implementation of the present disclosure, an image with a better quality may be obtained by automatically helping the user to determine the image quality in advance and further automatically prompting the user, so as to improve the accuracy and speed of target recognition, thereby effectively saving the processing resources and greatly shortening the processing time, and helping the user to more quickly obtain a desired service (for example, a reading service, a guide service, etc.).

According to some embodiments of the present disclosure, providing the prompt regarding that the bounding box is not detected includes making a prompt to cause the target object to get less close and/or be shifted.

According to some embodiments, the bounding box cannot be detected possibly because the target object is not within a collection range (that is, the field of view) of the image sensor, and in this case, causing the target object to get less close (from the image sensor) (by moving the target object and/or moving the image sensor) can enlarge the collection range, and it is possible to accommodate the target object into the enlarged collection range. Alternatively, in the current collection range, the position of the target object may be shifted so as to cause the target object to enter the collection range of the image sensor. Further alternatively, the user may move the target object so as to cause the target object to get less close from the image sensor to enlarge the collection range and simultaneously shift the target object so as to cause the target object to enter the collection range of the image sensor. In particular, it is important to give such a clear and unambiguous prompt in the case where a preview image is not provided or in the case where the user is a visually impaired person, and blind attempts by the user can be avoided, thereby causing fast collection of an image containing the target object.

As shown in FIG. 1, if at least a portion of the target object is detected in the image in step S102, it is possible to proceed to step S104.

In step S104, the prompt to adjust the relative position between the target object and the image sensor is provided in response to the geometric relationship between the at least a portion of the target object and the image satisfying the specific condition.

The "geometric relationship" here includes, but is not limited to, a distance relationship, an area ratio relationship, a positional relationship, etc.

According to some embodiments, as mentioned above, the at least a portion of the target object that is detected in the image may be represented by a corresponding bounding box detected in the image. Correspondingly, providing, in response to the geometric relationship between the at least a portion of the target object and the image satisfying the specific condition, the prompt to adjust the relative position between the target object and the image sensor in step S104 includes:

providing, if a distance between an edge of the bounding box and a corresponding edge of the image does not meet a specific distance requirement, the prompt to adjust the relative position between the target object and the image sensor.

According to some embodiments, the specific distance requirement may include a distance between each edge of the bounding box and a corresponding edge of the image being greater than a corresponding specific distance threshold.

Figure 4:
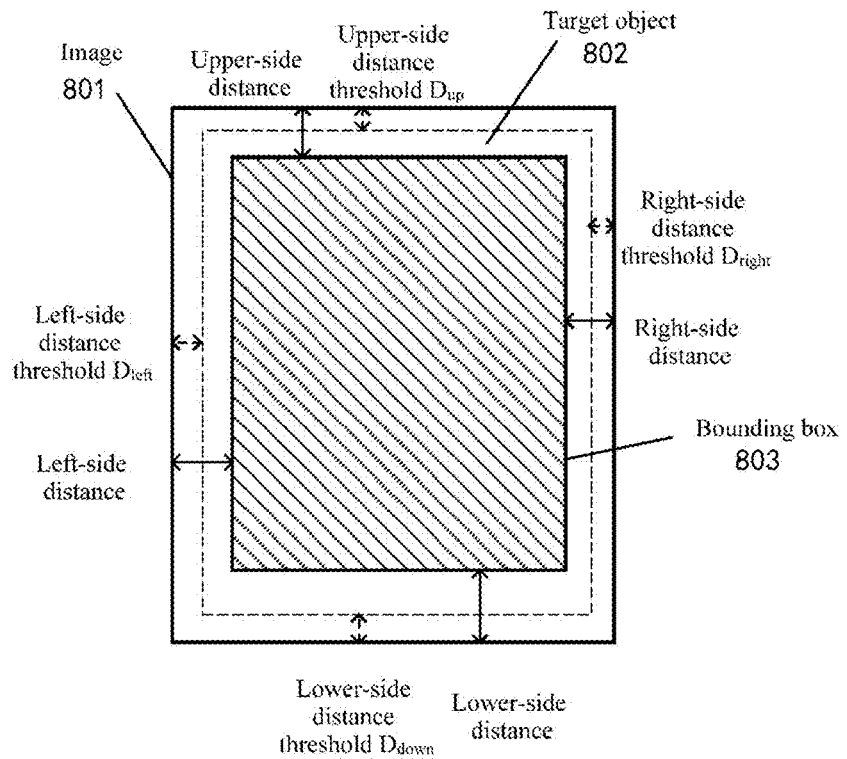
FIG. 4 shows an exemplary illustration for determining, according to distance thresholds, whether a bounding box is a complete bounding box.

As shown in FIG. 4, the rectangular bounding box of the target object and four edges of the image may correspond to four specific distance thresholds which, for example, may be referred to as an upper-side distance threshold Dup, a lower-side distance threshold Ddown, a left-side distance threshold Dleft, and a right-side distance threshold Dright, respectively (as shown by dashed arrows in FIG. 4). The bounding box is a complete bounding box only when the distance between each edge of the bounding box and the corresponding edge of the image is greater than the corresponding specific distance threshold, that is, an upper-side distance as a distance between an upper edge of the bounding box and an upper edge of the image, a lower-side distance as a distance between a lower edge of the bounding box and a lower edge of the image, a left-side distance as a distance between a left edge of the bounding box and a left edge of the image, and a right-side distance as a distance between a right edge of the bounding box and a right edge of the image (as shown by solid arrows in FIG. 4) are respectively greater than the upper-side distance threshold Dup, the lower-side distance threshold Ddown, the left-side distance threshold Dleft, and the right-side distance threshold Dright corresponding thereto.

The value of each distance threshold may be set according to actual requirements, and the distance thresholds are not necessarily equal.

According to some embodiments of the present disclosure, each distance threshold may be 0 or may be a value greater than 0. In this way, when the distances between the respective edges of the detected bounding box and the corresponding edges of the image are all greater than the respective corresponding distance thresholds, the detected bounding box is a complete bounding box, and the complete bounding box is smaller than the border frame of the image.

As described above, the value of each distance threshold may be set according to actual requirements, and the present disclosure does not need to impose additional limitations thereon. However, according to some embodiments, each specific distance threshold may be set such that the obtained complete bounding box is smaller than the border frame of the image, that is, there is no need to set the specific distance threshold too large here.

By the way, when at least one of the distances between the edges of the detected bounding box and the corresponding edges of the image is equal to 0, the previously described case where overlapping occurs between an edge of the bounding box and a corresponding edge of the image will occur, that is, the previously described case where whether overlapping occurs between the edge of the bounding box and the edge of the image is determined when the bounding box is detected in step S102 (more specifically, step S1022).

According to some embodiments, providing, if the distance between an edge of the bounding box and the corresponding edge of the image does not meet the specific distance requirement, the prompt to adjust the relative position between the target object and the image sensor includes:

directly making, if it is detected that the distance between each edge of the rectangular box and the corresponding edge of the image is less than the corresponding specific distance threshold, a prompt to cause the target object to get less close; and making, if it is detected that three or fewer of the distances between the edges of the rectangular box and the corresponding edges of the image are less than the corresponding specific distance thresholds, a prompt to cause the target object to get less close and/or to move the target object towards an orientation that is opposite to an orientation of a center position of the bounding box relative to a center position or a central region of the image.

According to some embodiments, the specific distance requirement may further include the distance between an edge of the bounding box and a corresponding edge of the image being within a corresponding specific distance range.

In this way, providing, in response to the geometric relationship between the at least a portion of the target object and the image satisfying the specific condition, the prompt to adjust the relative position between the target object and the image sensor in step S104 may include:

providing, if the distance between an edge of the bounding box and a corresponding edge of the image is not within the corresponding specific distance range, the prompt to adjust the relative position between the target object and the image sensor.

Here, whether the position of the target object in the image is suitable is determined by further determining whether the distance between an edge of the bounding box and a corresponding edge of the image is within the specific distance range.

Although the embodiments described with respect to step S104 both use the distance between an edge of the bounding box of the target object and a corresponding edge of the image, the earlier embodiment determines whether to provide a prompt to adjust the relative position between the target object and the image sensor, for example, by detecting whether the distance between each edge of the bounding box of the target object and the corresponding edge of the image is greater than the corresponding specific distance threshold. However, in the later embodiment, whether to provide the prompt to adjust the relative position between the target object and the image sensor is determined based on whether the distance between an edge of the bounding box and a corresponding edge of the image is within the corresponding specific distance range.

In other words, in step S104, it may be determined whether the position of the bounding box that has been detected is suitable by means of the corresponding specific distance threshold and/or the corresponding specific distance range, and if not suitable, it may be determined, for example, whether the position of the bounding box is offset to the up, down, left, right, etc. (for example, the case of being less than the corresponding specific distance threshold, or the case of being less than a lower limit of the corresponding specific distance range or greater than an upper limit of the corresponding specific distance range, etc.).

In addition, according to some embodiments, the above-mentioned determination relating to the specific distance threshold and the above-mentioned determination relating to the specific distance range may be combined into one determination step to be implemented. In other words, both the determination about the specific distance threshold and the determination about the specific distance range may be performed only by determining whether the distance between each edge of the detected bounding box and the corresponding edge of the image is within a corresponding specific distance range, provided that the lower limit of the specific distance range is the corresponding specific distance threshold. In addition, when the lower limit of the specific distance range is greater than the corresponding specific distance threshold, the determinations can be performed separately as described above. In summary, the embodiments of the present disclosure can vary flexibly, for example, separate determinations are performed here depending on actual requirements and/or considerations of processing resources, etc.

In summary, both a distance threshold and a distance range are requirements for the distance, and therefore may be represented by the "specific distance requirement" uniformly in the present disclosure. The specific distance requirement in the present disclosure includes, but is not limited to, the distance threshold and the distance range exemplified above.

As can be seen from the above description, regardless of whether the determination is made on the basis of the distance threshold or the distance range, any bounding box capable of meeting a related distance requirement is a complete bounding box.

In the present disclosure, the determination of the bounding box may be performed first, and then the determination about other conditions and/or making a prompt to adjust the position may be performed, so as to obtain an image in which the target object has a suitable position and/or size.

The determination regarding whether the bounding box is a complete bounding box may be further performed after the determination of the bounding box, and in the case where it is determined that the bounding box is a complete bounding box, other operations such as a position determination and/or making a prompt to adjust the position may be further performed, so that an image in which the target object has a suitable position and/or size can be obtained more quickly.

Figure 6:
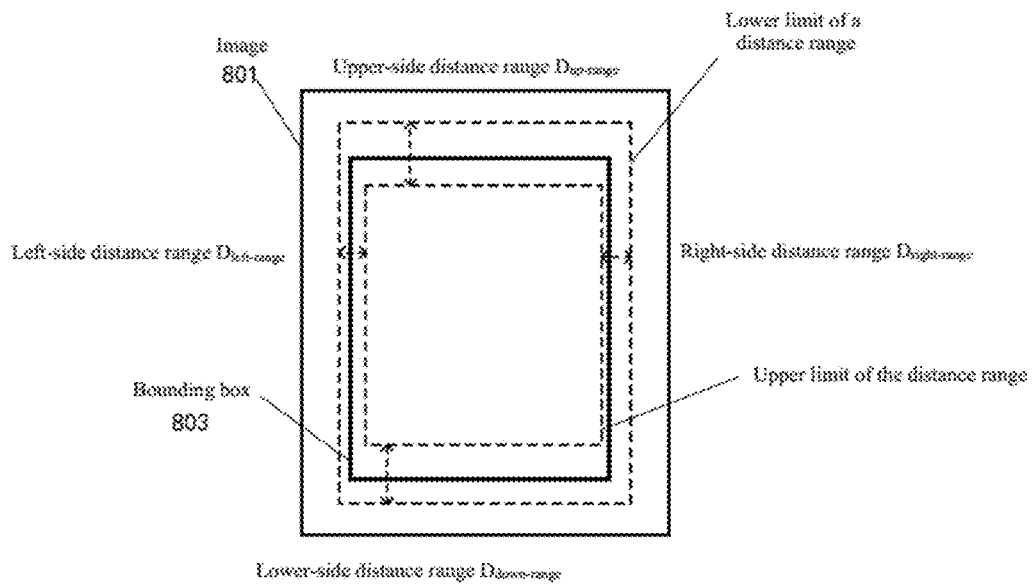
FIG. 6 provides an example in which a determination is performed based on a range of distances between edges of a bounding box and corresponding edges of an image.

FIG. 6 will give an example of determination based upon a distance range. As shown in FIG. 6, in the case where the detected bounding box is a rectangular box, for example, four specific distance ranges may be set, which are respectively referred to as an upper-side distance range Dup-range, a lower-side distance range Ddown-range, a left-side distance range Dleft-range, and a right-side distance range Dright-range.

It is noted that the distance ranges here are different from the "upper-side distance threshold Dup, lower-side distance threshold Ddown, left-side distance threshold Dleft, right-side distance threshold Dright" described above. The main difference lies in that each distance range is defined by both a respective lower limit of the distance range and a respective upper limit of the distance range, whereas the above-mentioned specific distance threshold is one value. Further, the lower limit of each distance range may be greater than or equal to the corresponding distance threshold described above, and in the case of the above-mentioned combined determination, the lower limit of the distance range is equal to a corresponding distance threshold, whereas in the case of the separate determination, the lower limit of the distance range is greater than a corresponding distance threshold. Here, the determination condition about the specific distance range is relatively stricter than the determination condition about the specific distance threshold.

In FIG. 6, the upper-side distance range, the lower-side distance range, the left-side distance range, and the right-side distance range are respectively shown by dashed arrows in the figure, the large dashed box in FIG. 6 is constituted by the lower limits of the upper-side distance range, the lower-side distance range, the left-side distance range and the right-side distance range, and the small dashed box in FIG. 6 is constituted by the upper limits of the upper-side distance range, the lower-side distance range, the left-side distance range and the right-side distance range (for clarity, the target object within the bounding box is not shown in FIG. 6). If each edge of the detected bounding box is located between the large dashed box and the small dashed box, for example, the bounding box 803 in FIG. 6 is between the large dashed box and the small dashed box, indicating that the distance between each edge of the bounding box and the corresponding edge of the image is within a respective specific distance range (the distance between each edge of the bounding box and the corresponding edge of the image is greater than a lower limit of a respective distance range and less than an upper limit of the respective distance range), it may not be necessary to make a prompt to adjust the relative position between the target object and the image sensor, or whether it is necessary to make a prompt to adjust the relative position may be further determined by means of other conditions. Otherwise, if at least one of the edges of the detected bounding box is not located between the large dashed box and the small dashed box (at least one of the distances between the edges of the bounding box and the corresponding edges of the image is not within the corresponding specific distance range), it is considered that a prompt can be made to adjust the relative position.

Here, as described above, whether the position and/or size of the target object in the image is suitable is determined by further determining whether the distance between an edge of the bounding box and a corresponding edge of the image is within the specific distance range, that is, by controlling both an upper limit of a distance between the edges and a lower limit of the distance between the edges. For example, the determination regarding whether the distance between the edges is within a certain distance range can further reflect the image quality, for example, when one or some of the distances between the edges are less than a lower limit of the corresponding distance range, the target object may be too close to the edge of the image. Since the resolution of the edge of the image is less than the resolution of a central portion of the image, it is possible to obtain an image with a better quality by prompting the user how to adjust a relative distance between the target object and the image sensor (which will be described later) such that the target object leaves the edge of a viewfinder frame and gets close to the center of the viewfinder frame. As another example, when one or some of the distances between the edges are greater than an upper limit of the corresponding distance range, it is possible that the position of the target object in the image is offset or the size of the entire target object in the image is too small, which affects the quality of the image, or even further affects the service (for example, a reading service, a guide service, etc. for the visually impaired) provided to the user. In this way, it is also possible to obtain an image with a better quality by prompting the user how to adjust the relative distance between the target object and the image sensor (which will be described later) such that the position and/or the size of the target object in the image are more suitable.

According to some embodiments, providing, if the distance between an edge of the bounding box and a corresponding edge of the image is not within the corresponding specific distance range, the prompt to adjust the relative position between the target object and the image sensor in step S104 may include:

respectively detecting distances between an upper edge, a lower edge, a left edge, and a right edge of the bounding box and a corresponding upper edge, lower edge, left edge, and right edge of the image to correspondingly obtain an upper-side distance, a lower-side distance, a left-side distance, and a right distance between the bounding box and the image, that is, obtaining the upper-side distance as the distance between the upper edge of the bounding box and the upper edge of the image, the lower-side distance as the distance between the lower edge of the bounding box and the lower edge of the image, the left-side distance as the distance between the left edge of the bounding box and the left edge of the image, and the right-side distance as the distance between the right edge of the bounding box and the right edge of the image (these four distances are not shown in FIG. 6 due to the limitation of the length of the text); and for the upper-side distance range, the lower-side distance range, the left-side distance range, and the right-side distance range respectively corresponding to the upper edge, lower edge, left edge, and right edge of the image, wherein each of the distance ranges is jointly defined by a respective upper distance limit and a respective lower distance limit, if at least one of the upper-side distance, the lower-side distance, the left-side distance, and the right-side distance is not within the respective upper-side distance range, the lower-side distance range, the left-side distance range, and the right-side distance range (that is, at least one of the upper-side distance, the lower-side distance, the left-side distance, and the right-side distance is not in a position between the large dashed box and the small dashed box shown in FIG. 6), providing the prompt to adjust the relative position between the target object and the image sensor.

It is noted that the above-mentioned specific distance ranges (the lower limits of the upper-side distance range, the lower-side distance range, the left-side distance range, and the right-side distance ranges and the upper limits of the upper-side distance range, the lower-side distance range, the left-side distance range, and the right-side distance ranges as shown in FIG. 6) can be set according to actual requirements, which will not be limited herein. For example, for a normal image collected by a normal image sensor, all of the upper-side distance range, the lower-side distance range, the left-side distance range, and the right-side distance range may be set to [10% of the number of pixels corresponding to the length of the corresponding edge of the image, 40% of the number of pixels corresponding to the length of the corresponding edge of the image]. In summary, the lower limit of the distance range may be 0 or a value greater than 0, and the upper limit of the distance range should be a value greater than the corresponding lower limit of the distance range. In addition, the specific upper-side, lower-side, left-side, and right-side distance ranges may be unequal. Certainly, it is also possible, as in the example here, that the four specific distance ranges are equal.

It is noted that FIG. 6 shows only an example for explaining how to determine, based on whether the distance between an edge of the bounding box and a corresponding edge of the image is within the corresponding specific distance range, whether to make a prompt to adjust the relative position between the target object and the image sensor. It will be appreciated by those skilled in the art that the present disclosure is not limited to this example.

According to some embodiments, providing, in response to the distance between an edge of the bounding box and a corresponding edge of the image not meeting the specific distance requirement, the prompt to adjust the relative position between the target object and the image sensor in step S104 includes:

making, if at least one of the distances between the edges of the bounding box and the corresponding edges of the image is less than a lower limit of the corresponding specific distance range, a prompt to cause the target object to get less close and/or to cause the target object to be shifted in a direction opposite to an orientation of an edge of the bounding box that is at a distance less than the lower limit of the corresponding specific distance range from a corresponding edge of the image; and making, if at least one of the distances between the edges of the bounding box and the corresponding edges of the image is greater than an upper limit of the corresponding specific distance range, a prompt to cause the target object to get closer and/or cause the target object to be shifted in a direction consistent with an orientation of an edge of the bounding box that is at a distance greater than the upper limit of the corresponding specific distance range from a corresponding edge of the image.

Figure 7A:
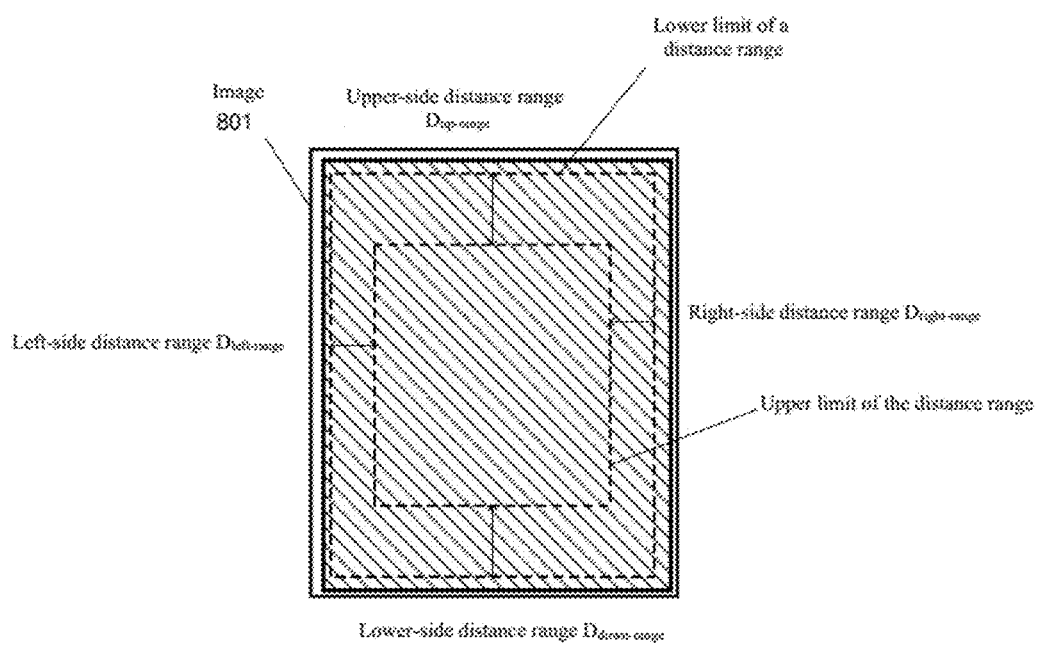
FIGS. 7A, 7B and 7C show example cases where a distance between an edge(s) of a bounding box and a corresponding edge(s) of an image is not within a specific distance range(s).
Figure 7B:
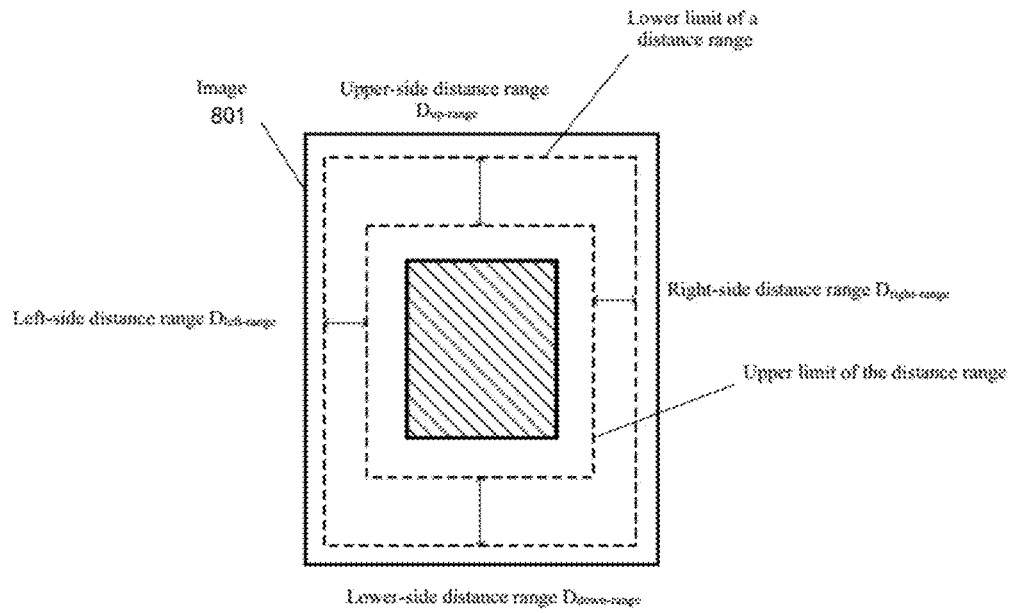
Figure 7C:
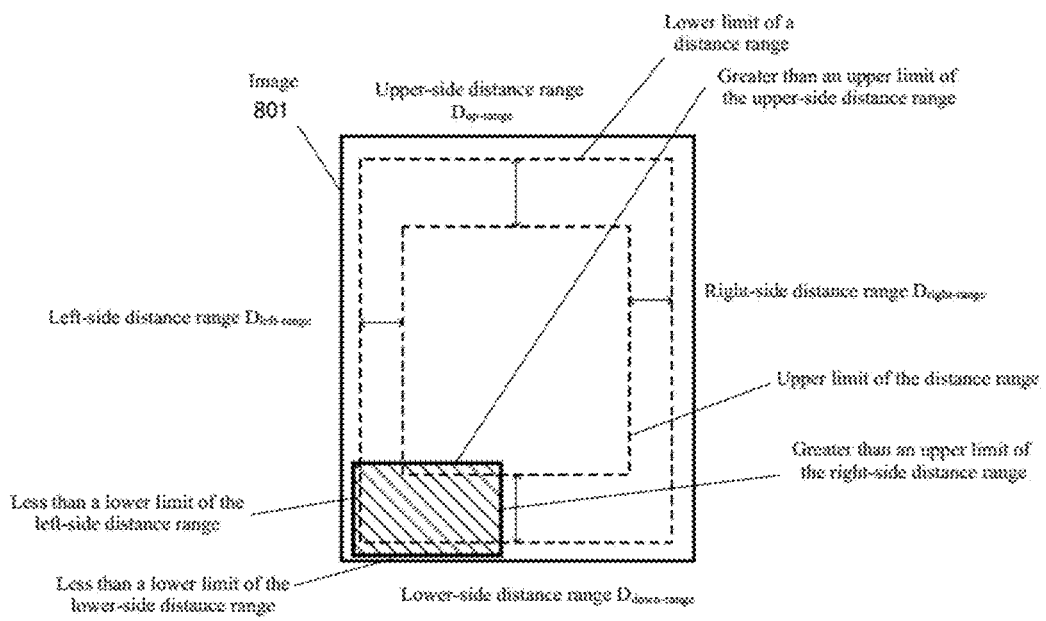

As shown in FIGS. 7A, 7B, and 7C, in the case where at least one of the distances between the edges of the detected bounding box and the corresponding edges of the image is less than the lower limit of the corresponding specific distance range, the user is prompted to cause the target object to get less close (with reference to FIG. 7A) and/or to cause the target object to be shifted in a direction opposite to the orientation in which an edge of the bounding box that is at a distance less than the lower limit of the corresponding specific distance range, from a corresponding edge of the image, is oriented (with reference to FIG. 7C); and in the case where at least one of the distances between the edges of the detected bounding box and the corresponding edges of the image is greater than the upper limit of the corresponding specific distance range, a prompt is made to cause the target object to get closer (with reference to FIG. 7B) and/or to cause the target object to be shifted in a direction consistent with the orientation in which an edge of the bounding box that is at a distance greater than the upper limit of the corresponding specific distance range from a corresponding edge of the image, is oriented (with reference to FIG. 7C).

Here, as described above, when determining that the distance between an edge of the bounding box and a corresponding edge of the image is not within the specific distance range, it is determined that the image quality needs to be improved. In this implementation, an image with a better quality can be obtained by prompting the user how to adjust the relative distance between the target object and the image sensor such that the position and/or size of the target object in the image are more suitable.

It is noted that FIGS. 7A, 7B, and 7C give several example cases where "the distance between an edge of the detected bounding box and a corresponding edge of the image is not within the corresponding specific distance range" for ease of understanding, but it does not represent that the present disclosure is limited to these example cases only.

In addition, according to some embodiments, providing, in response to the geometric relationship between the at least a portion of the target object and the image satisfying the specific condition, the prompt to adjust the relative position between the target object and the image sensor in step S104 may include:

providing, if a center position of the bounding box is not in a central region of the image, the prompt to adjust the relative position between the target object and the image sensor.

Here, whether the position of the target object collected in the image is centered is determined by comparing the center position of the bounding box with the central region of the image.

According to some embodiments, the center position of the bounding box may be determined by means of positional information of the bounding box in the image. Specifically, for example, the center position of the bounding box may be determined by means of the position of each vertex of the bounding box in the image. In addition to the position of the vertex, the center position of the bounding box may be further determined by means of other positional information of the bounding box in the image, which is not specifically limited in the present disclosure.

In addition, the central region of the image may be a region surrounding a central point of the image. The size and shape of the central region may be determined according to actual situations, and the size and shape thereof are not particularly limited in the present disclosure. For example, the central region may be in the shape of a rectangle, a circle, etc.

The central point here may be, for example, a geometric center, so that the central point of the image may also be, for example, a central point (geometric center) of the central region.

Here, as described above, whether the position of the target object is centered in the image is determined by determining whether the center position of the bounding box is in the central region of the image. For example, the determination regarding whether the center position of the bounding box is in the central region of the image can further reflect the image quality, for example, when the center position of the bounding box is not in the central region of the image, the target object may not be centered and may be somewhat deviated from the central region (or center position) of the image, which affects the quality of the image, or even further affects the service (for example, a reading service, a guide service, etc. for the visually impaired) provided to the user. In this way, it is also possible to obtain an image with a better quality by prompting the user how to adjust the relative distance between the target object and the image sensor (which will be described later) such that the position of the target object in the image is more suitable (for example, centered as much as possible).

Figure 8A:
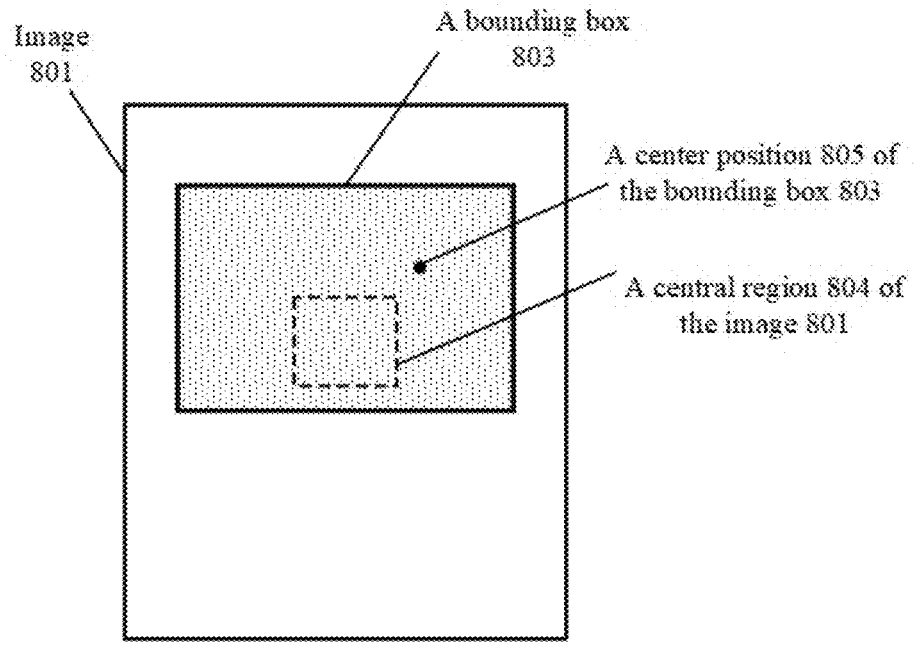
FIGS. 8A and 8B provide example cases of a positional relationship between a center position of a bounding box and a central region of an image.
Figure 8B:
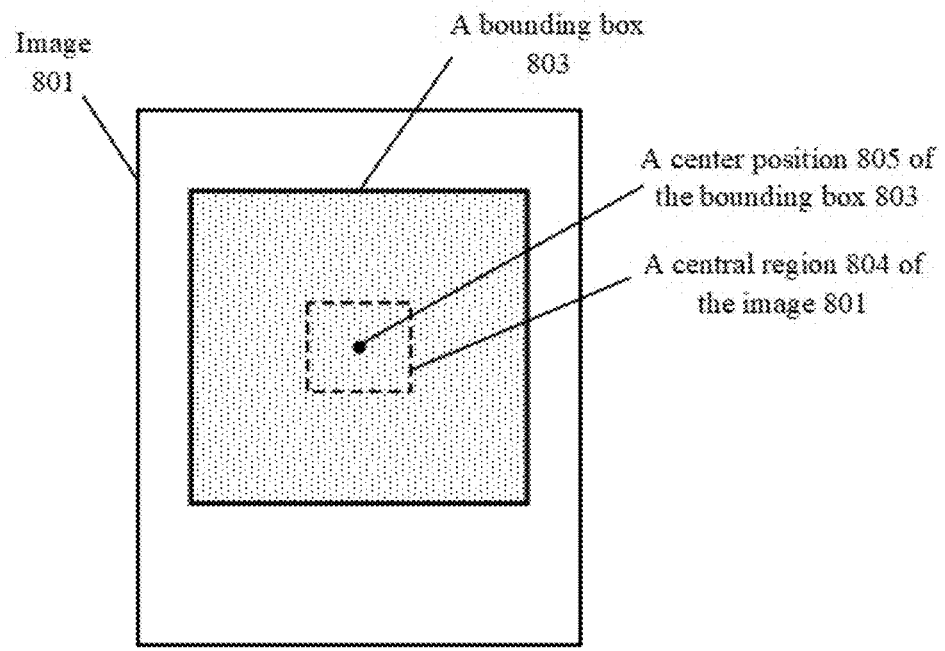

FIG. 8A shows a case where the center position 805 of the detected bounding box 803 of the target object is not in a central region 804 of the image 801, and in this case, the prompt may be provided to adjust the relative position between the target object and the image sensor. In addition, FIG. 8B shows a case where the center position 805 of the detected bounding box 803 of the target object is in the central region 804 of the image 801, and in this case, the next operation may be performed as required.

According to some embodiments, providing, if the center position of the bounding box is not in the central region of the image, the prompt to adjust the relative position between the target object and the image sensor in step S104 may include:

prompting, based on a direction of the center position of the bounding box relative to the central region of the image, the user to move the target object in an opposite direction.

As previously described in FIG. 8A, the center position 805 of the detected bounding box 803 is not in the central region 804 of the image 801. As can be seen from FIG. 8A, the center position 805 is somewhat in an upper right direction relative to the central region 804, so that it can be determined that: the target object may be moved in a lower left direction opposite to the upper right direction such that the center position 805 of the bounding box 803 enters the central region 804 of the image 801.

Here, as described above, when determining that the center position of the bounding box is not in the central region of the image, it is determined that the image quality needs to be improved. In this implementation, an image with a better quality can be obtained by prompting the user how to adjust the relative distance between the target object and the image sensor such that the position of the target object in the image is more suitable.

In addition, according to some embodiments, providing, in response to the geometric relationship between the at least a portion of the target object and the image satisfying the specific condition, the prompt to adjust the relative position between the target object and the image sensor in step S104 may include:

providing, if a ratio of an area of the bounding box to an area of the image is not within a specific ratio range, the prompt to adjust the relative position between the target object and the image sensor.

Here, whether the size of the target object collected in the image is suitable is determined by determining the ratio between the areas.

Figure 9A:
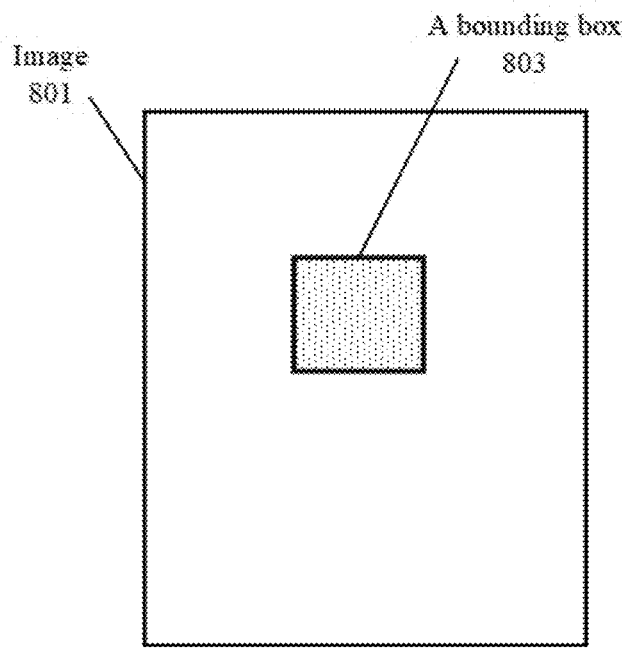
FIGS. 9A, 9B and 9C provide an example case of a relationship between an area of a bounding box and an area of an image.
Figure 9B:
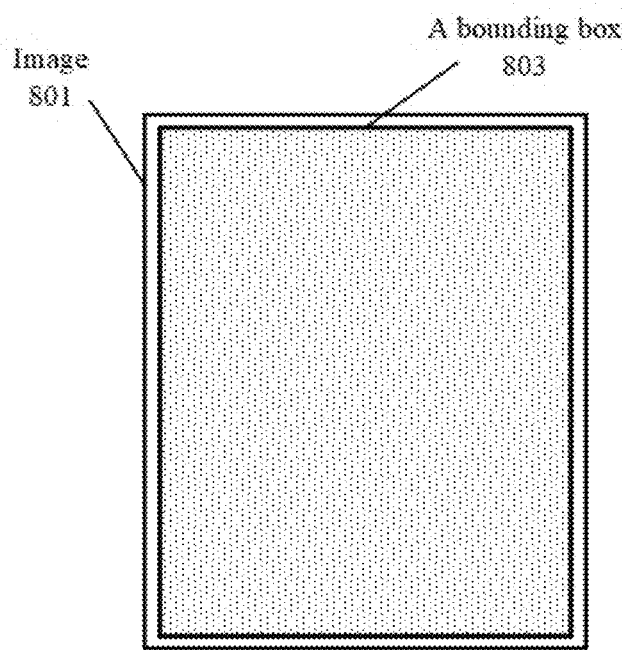
Figure 9C:
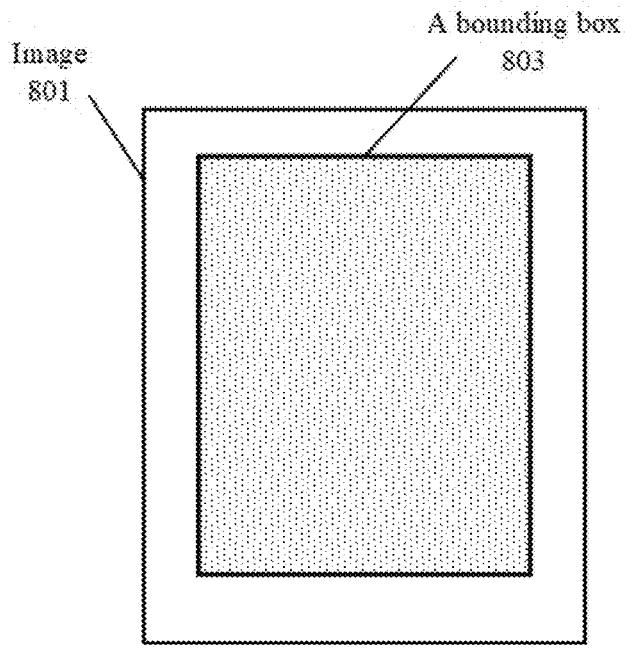

As shown in FIG. 9A, the ratio of the area of the bounding box to the area of the image is about 1:9, which is too small; as shown in FIG. 9B, the ratio of the area of the bounding box to the area of the image is about 94:100, which is too large; and as shown in FIG. 9C, the ratio of the area of the bounding box to the area of the image is about 3:4, which is suitable.

The specific ratio range described above may be set according to specific requirements, such as a ratio range of 50% to 85% or other ranges, which is not limited in the present disclosure.

Here, as described above, whether the size of the target object in the image is suitable is determined by determining whether the ratio of the area of the bounding box to the area of the image is within the specific ratio range. For example, the determination regarding whether the ratio of the area of the bounding box to the area of the image is within the specific ratio range (an image that meets the ratio range has a relatively suitable image size and a better image quality) can further reflect the image quality, for example, when the ratio of the area of the bounding box to the area of the image is not within the specific ratio range, the target object may be too large or too small in the image, which affects the quality of the image, or even further affects the service (for example, a reading service, a guide service, etc. for the visually impaired) provided to the user. In this way, it is also possible to obtain an image with a better quality by prompting the user how to adjust the relative distance between the target object and the image sensor (which will be described later) such that the size of the target object in the image is more suitable.

According to some embodiments, providing, if the ratio of the area of the bounding box to the area of the image is not within the specific ratio range, the prompt to adjust the relative position between the target object and the image sensor in step S104 may include:

making, if the ratio of the area of the bounding box to the area of the image is greater than an upper limit of the specific ratio range, a prompt to cause the target object to get less close; and making, if the ratio of the area of the bounding box to the area of the image is less than a lower limit of the specific ratio range, a prompt to cause the target object to get closer.

For example, in the case where the ratio between the areas is too small as shown in FIG. 9A, a prompt may be made to cause the target object to get closer. Otherwise, in the case where the ratio between the areas is too large as shown in FIG. 9B, a prompt may be made to cause the target object to get less close.

Here, as described above, when determining that the ratio of the area of the bounding box to the area of the image is not in the specific ratio range, it is determined that the image quality needs to be improved. In this implementation, an image with a better quality can be obtained by prompting the user how to adjust the relative distance between the target object and the image sensor such that the size of the target object in the image is more suitable.

According to some embodiments, the target object includes a text region, and providing, in response to the geometric relationship between the at least a portion of the target object and the image satisfying the specific condition, the prompt to adjust the relative position between the target object and the image sensor in step S104 may include:

determining whether an angle of a text line of the text region of the target object relative to an edge of the image (hereinafter referred to as "inclination angle of a text line") is within a specific angle range, and prompting, if the angle is not within the specific angle range, the user to adjust a relative angle between the target object and the image sensor.

The above-mentioned specific angle range may be, for example, [−30°, 30°]. In view of factors such as algorithm accuracy and collection stability, in the present disclosure, in the case where the inclination angle of the text line is within the specific angle range, the text line is considered to be substantially horizontal. It will be appreciated that in the case where the algorithm is more refined and the collection stability is improved, the specific angle range may be properly adjusted, for example, to [−20°, 20°], or [−10°, 10°], etc.

Figure 10:
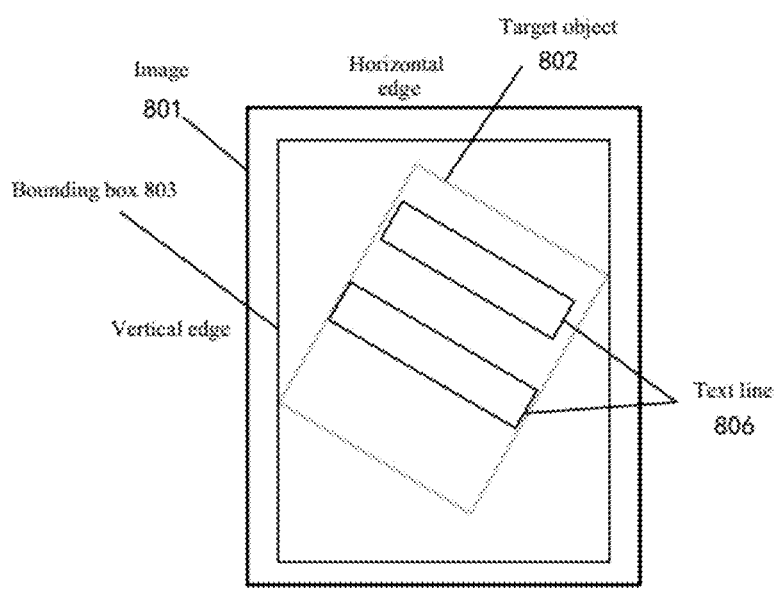
FIG. 10 provides an example case where a text line tilts.

In the present disclosure, the inclination angle of the text line may refer to an angle of a text line (for example, the first text line may be selected) with respect to an edge of the image (for ease of understanding and description, the edge may be defined as a horizontal edge, and another edge of the image that is adjacent to the edge is defined as a vertical edge). The expression "the text line is horizontal" may mean that the text line is substantially parallel to the horizontal edge of the image (for example, the text line has an inclination angle less than 30 degrees). It may be considered that "the text line is inclined" if exceeding the specific angle range, for example, an angle of approximately 45 degrees is formed between a text line 806 in FIG. 10 and the horizontal edge of the image. In the case where "the text line is inclined", the user may be prompted to adjust the relative angle between the target object and the image sensor.

According to some embodiments, the inclination angle of the text line may be detected by the following methods: the Hough transform-based method, the cross-correlation-based method, the projection-based method, the Fourier transform-based method, the K-nearest neighbor cluster method, etc.

According to some embodiments, the relative angle between the target object and the image sensor may be adjusted by adjusting the angle of the target object, and the prompt information of the relative angle of the target object provided may include, but is not limited to, the rotation direction and the rotation angle of the target object, or may include only the rotation direction or the rotation angle, or may further include other prompt information, for example, the voice such as "please adjust the angle of the target object" may be played.

Here, as described above, whether the position and/or pose of the target object in the image are suitable is determined by determining the inclination angle of the text line of the text region of the target object in the image. For example, the determination regarding whether the inclination angle of the text line of the text region of the target object in the image is within the specific angle range can further reflect the image quality, for example, when the inclination angle of the text line of the text region of the target object in the image is not within the specific angle range, the recognition speed and the recognition accuracy of the text in the image are affected, or even the service (for example, a reading service, a guide service, etc. for the visually impaired) provided to the user are further affected, and the pose of the target object may need to be adjusted. Therefore, here, an image with a better quality can be obtained by prompting the user how to adjust the relative angle, etc. between the target object and the image sensor such that the position and/or pose of the target object in the image are more suitable.

In the case where the inclination angle of the text line described above is not within the specific angle range, it is possible to cause the image sensor to re-collect an image and continue to detect until the inclination angle of the text line in the re-collected image is within the specific angle range, so as to obtain an image satisfying the quality requirements.

Three examples are given above to determine whether the user is prompted to adjust the relative position between the target object and the image sensor based on the geometric relationship between the bounding box and the image, wherein the examples are respectively based upon the distance between an edge of the bounding box and an edge of the image (the specific distance requirement, for example, may include a distance threshold-based distance requirement and a distance range-based distance requirement), whether the center position of the bounding box is in the central region of the image, and the ratio of the area of the bounding box to the area of the image. In addition, an example of determining whether to prompt the user to adjust the relative angle between the target object and the image sensor based on the inclination angle of the text line is further given. It is noted that the present disclosure is not limited to the four determination conditions in the examples above, but other determination conditions may also be used, and the description will not be described here in view of the length of the text.

In addition, for the three determination conditions given above that are based on the geometric relationship between the bounding box and the image, determinations may be respectively performed as described above, or a determination may be performed for any combination of these conditions. For example, it is possible to combine the conditions in a pairwise manner, for example, to first determine whether the center position of the bounding box is in the central region of the image, and then determine whether the area ratio is suitable. Certainly, it is also possible to conversely first determine whether the area ratio is suitable, and then determine whether the center position is suitable. Alternatively, three conditions may be combined with one another, for example, to first determine whether the center position of the bounding box is in the central region of the image, then determine whether the area ratio is suitable, and finally determine whether the distance between edges meets the specific distance requirement (for example, greater than a specified distance threshold and/or within a specified distance range). In addition, the determination of the inclination angle of the text line may be combined with other conditions. The more determination conditions, the more the position, size, etc., of the obtained target object in the image may meet the requirements, but the computing resources and time required correspondingly may be slightly more.

By the combined determination, an image with a better quality can be obtained, a more accurate prompt can be automatically provided to the user, the processing time can be greatly shortened, the processing resources can be effectively reduced, and a better and more accurate service can be provided to the user.

For more clarity, a determination process using a way of combining the conditions in a pairwise manner will be described below in connection with an example. As mentioned above, the at least a portion of the target object may be represented by a corresponding bounding box detected in the image.

Figure 11A:
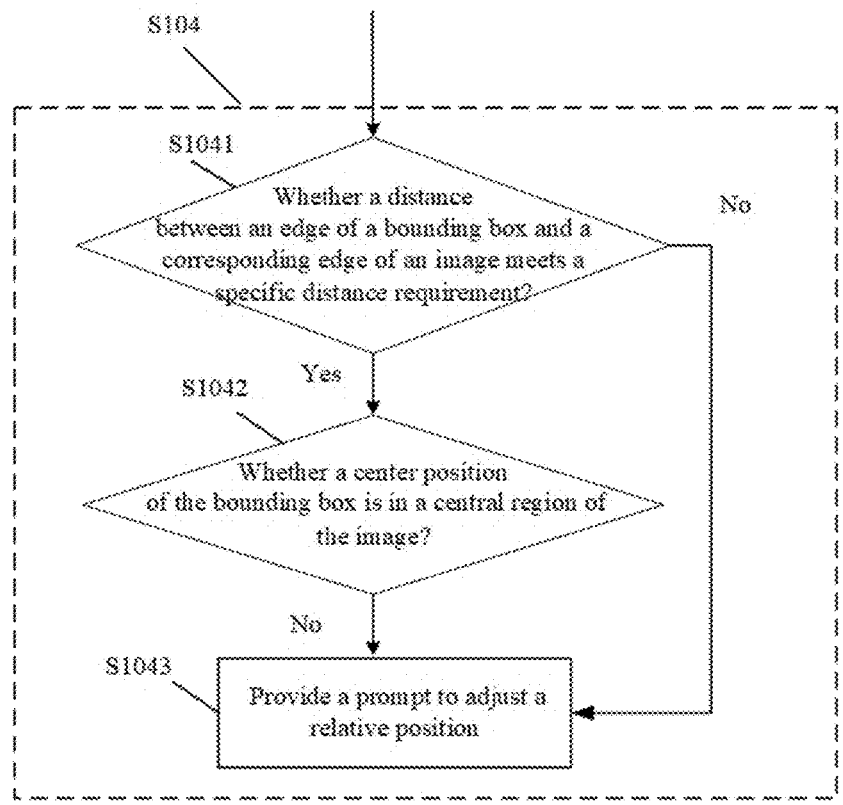
FIGS. 11A, 11B, 11C, 11D, 11E and 11F show examples of determination ways each based on a combination of conditions in a pairwise manner.

According to some embodiments, as shown in FIG. 11A, providing, in response to the geometric relationship between the at least a portion of the target object and the image satisfying the specific condition, the prompt to adjust the relative position between the target object and the image sensor in step S104 may include:

step S1041: determining whether a distance between an edge of the bounding box and a corresponding edge of the image meets a specific distance requirement;

if the distance between an edge of the bounding box and a corresponding edge of the image meets the specific distance requirement, proceeding to step S1042 to determine whether a center position of the bounding box is in a central region of the image; and if it is determined that the center position of the bounding box is not in the central region of the image, proceeding to step S1043 to provide the prompt to adjust the relative position between the target object and the image sensor.

In addition, if the distance between an edge of the bounding box and a corresponding edge of the image does not meet the specific distance requirement, it is possible to proceed to step S1043 to provide the prompt to adjust the relative position between the target object and the image sensor.

Here, the specific distance requirement may include, for example, the distance threshold-based distance requirement and the distance range-based distance requirement as described above.

In this implementation, the determination condition about the distance between an edge of the bounding box and an edge of the image and the determination condition about the center position of the bounding box are combined together to determine whether the position and/or the size of the target object in the image are suitable. In the case of determining that the requirement is not met through an automatic determination, as described above, according to some embodiments, a prompt will be automatically provided to the user to help the user to quickly adjust the relative position between the target object and the image sensor, so as to more quickly obtain an image that satisfies quality requirements (for example, whether the position and/or the size of the target object in the image are suitable), thereby effectively saving the processing resources and greatly shortening the processing time.

According to some implementations, for example, in the case where a visually impaired user or a user wearing a wearable device that is not provided with a display screen cannot determine the image quality, in an exemplary implementation of the present disclosure, an image with a better quality is obtained by automatically helping the user to determine the image quality in advance and further automatically prompting the user, so as to improve the accuracy and speed of target recognition, thereby effectively saving the processing resources and greatly shortening the processing time, and helping the user to more quickly obtain a desired service (for example, a reading service, a guide service, etc.).

An image with a better quality is obtained by automatically helping the user to determine the image quality in advance and further automatically prompting the user, thereby effectively saving the processing resources and greatly shortening the processing time, and helping the user to more quickly obtain a desired service (for example, a reading service, a guide service, etc.).

Figure 11B:
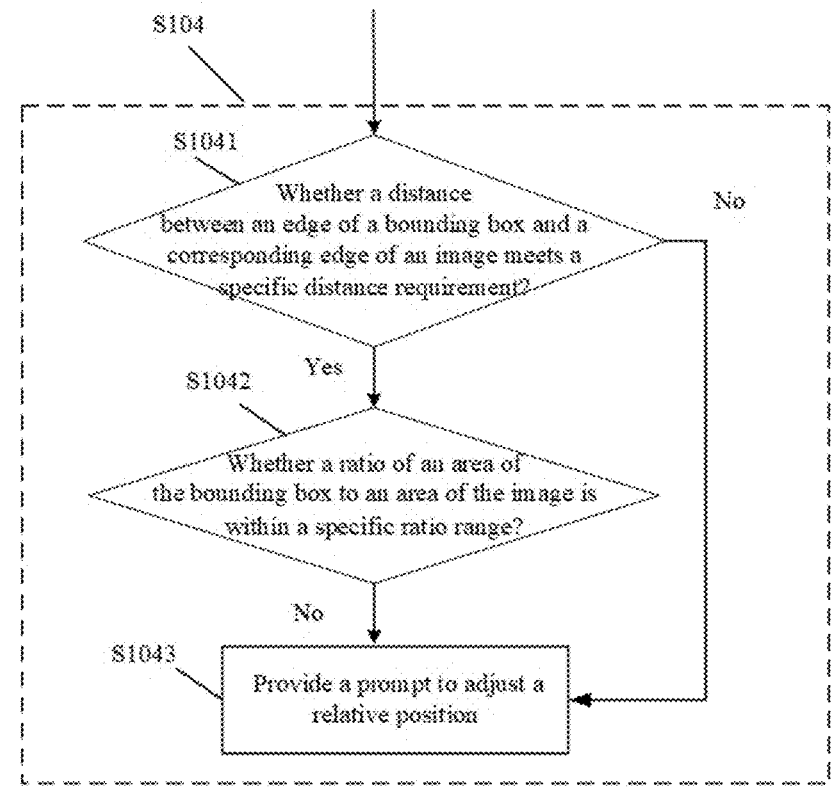

According to some embodiments, as shown in FIG. 11B, providing, in response to the geometric relationship between the at least a portion of the target object and the image satisfying the specific condition, the prompt to adjust the relative position between the target object and the image sensor in step S104 may include:
   step S1041: determining whether a distance between an edge of the bounding box and a corresponding edge of the image meets a specific distance requirement;
   if the distance between an edge of the bounding box and a corresponding edge of the image meets the specific distance requirement, proceeding to step S1042 to determine whether a ratio of an area of the bounding box to an area of the image is within a specific ratio range; and
   if it is determined that the ratio of the area of the bounding box to the area of the image is not within the specific ratio range, proceeding to step S1043 to provide the prompt to adjust the relative position between the target object and the image sensor.

In addition, if the distance between an edge of the bounding box and a corresponding edge of the image does not meet the specific distance requirement, it is possible to proceed to step S1043 to provide the prompt to adjust the relative position between the target object and the image sensor.

In this implementation, the determination condition about the distance between an edge of the bounding box and an edge of the image and the determination condition about the area ratio are combined together to determine whether the position and the size of the target object in the image are suitable. Similarly to the above, in the case of determining that the requirement is not met through an automatic determination, as described above, according to some embodiments, a prompt will be automatically provided to the user to help the user to quickly adjust the relative position between the target object and the image sensor, so as to more quickly obtain an image that satisfies quality requirements (for example, the position and the size of the target object in the image are suitable), thereby effectively saving the processing resources and greatly shortening the processing time. Also, for example, in the case where a visually impaired user or a user wearing a wearable device that is not provided with a display screen cannot determine image quality, an image with a better quality is obtained by automatically helping the user to determine the image quality in advance and further automatically prompting the user, thereby effectively saving the processing resources and greatly shortening the processing time, and helping the user to more quickly obtain a desired service (for example, a reading service, a guide service, etc.).

Figure 11C:
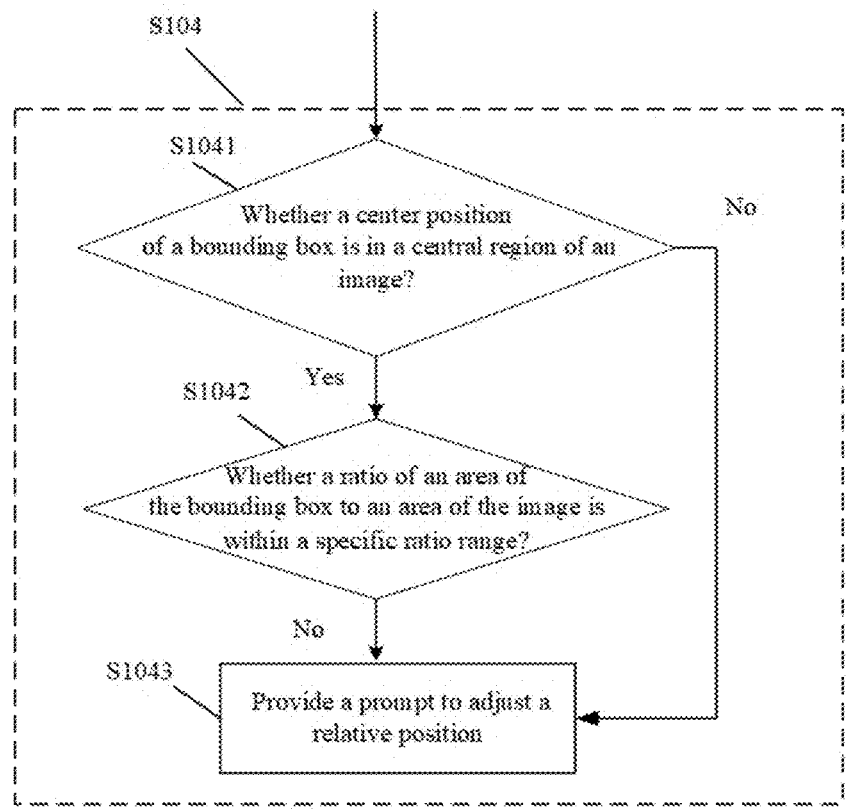

According to some embodiments, as shown in FIG. 11C, providing, in response to the geometric relationship between the at least a portion of the target object and the image satisfying the specific condition, the prompt to adjust the relative position between the target object and the image sensor in step S104 may include:
   step S1041: determining whether a center position of the bounding box is in a central region of the image;
   if it is determined that the center of the bounding box is in the central region of the image, proceeding to step S1042 to determine whether a ratio of an area of the bounding box to an area of the image is within a specific ratio range; and
   if it is determined that the ratio of the area of the bounding box to the area of the image is not within the specific ratio range, proceeding to step S1043 to provide the prompt to adjust the relative position between the target object and the image sensor.

In addition, if the center position of the bounding box is not in the central region of the image, it is possible to proceed to step S1043 to provide the prompt to adjust the relative position between the target object and the image sensor.

In this implementation, the determination condition about the center position of the bounding box and the determination condition about the area ratio are combined together to determine whether the position and the size of the target object in the image are suitable. Similarly to the above, in the case of determining that the requirement is not met through an automatic determination, a prompt will be automatically provided to the user to help the user to quickly adjust the relative position between the target object and the image sensor, so as to more quickly obtain an image that satisfies quality requirements, thereby effectively saving the processing resources and greatly shortening the processing time. Also, for example, in the case where a visually impaired user or a user wearing a wearable device that is not provided with a display screen cannot determine image quality, an image with a better quality is obtained by automatically helping the user to determine the image quality in advance and further automatically prompting the user, thereby effectively saving the processing resources and greatly shortening the processing time, and helping the user to more quickly obtain a desired service (for example, a reading service, a guide service, etc.). The beneficial technical effects of the later several combinations are similar thereto and will not be described in detail below.

Figure 11D:
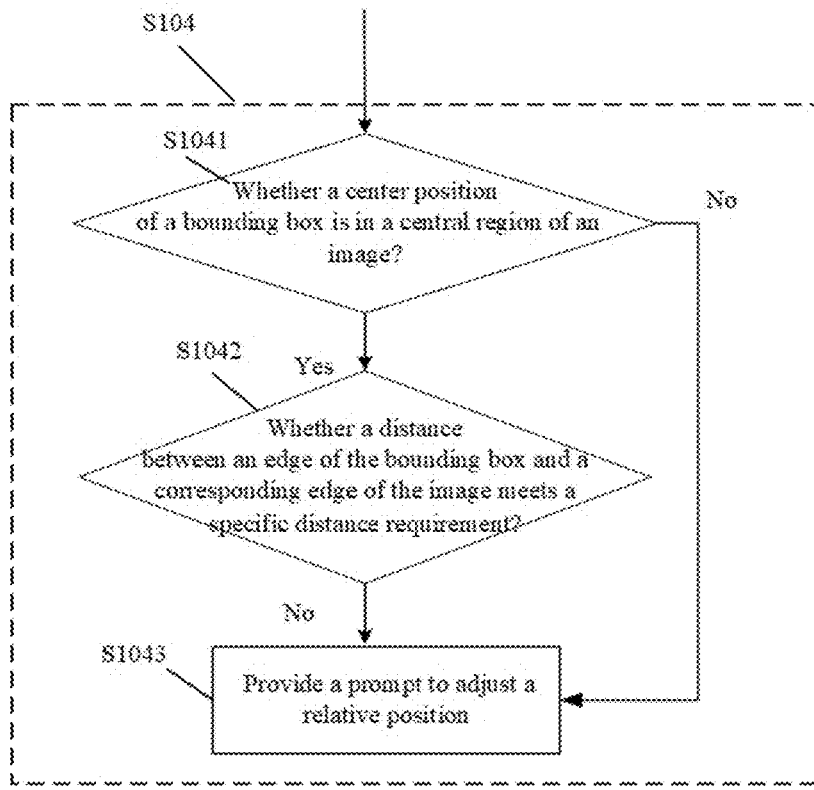

According to some embodiments, as shown in FIG. 11D, providing, in response to the geometric relationship between the at least a portion of the target object and the image satisfying the specific condition, the prompt to adjust the relative position between the target object and the image sensor in step S104 may include:

step S1041: determining whether a center position of the bounding box is in a central region of the image;

if it is determined that the center position of the bounding box is in the central region of the image, proceeding to step S1042 to determine whether a distance between an edge of the bounding box and a corresponding edge of the image meets a specific distance requirement; and if it is determined that the distance between an edge of the bounding box and a corresponding edge of the image does not meet the specific distance requirement, proceeding to step S1043 to provide the prompt to adjust the relative position between the target object and the image sensor.

Also, if the center position of the bounding box is not in the central region of the image, it is possible to proceed to step S1043 to provide the prompt to adjust the relative position between the target object and the image sensor.

In this implementation, the determination condition about the center position of the bounding box and the determination condition about the distance between an edge of the bounding box and an edge of the image are combined together in a converse order to determine whether the position of the target object in the image is suitable.

Figure 11E:
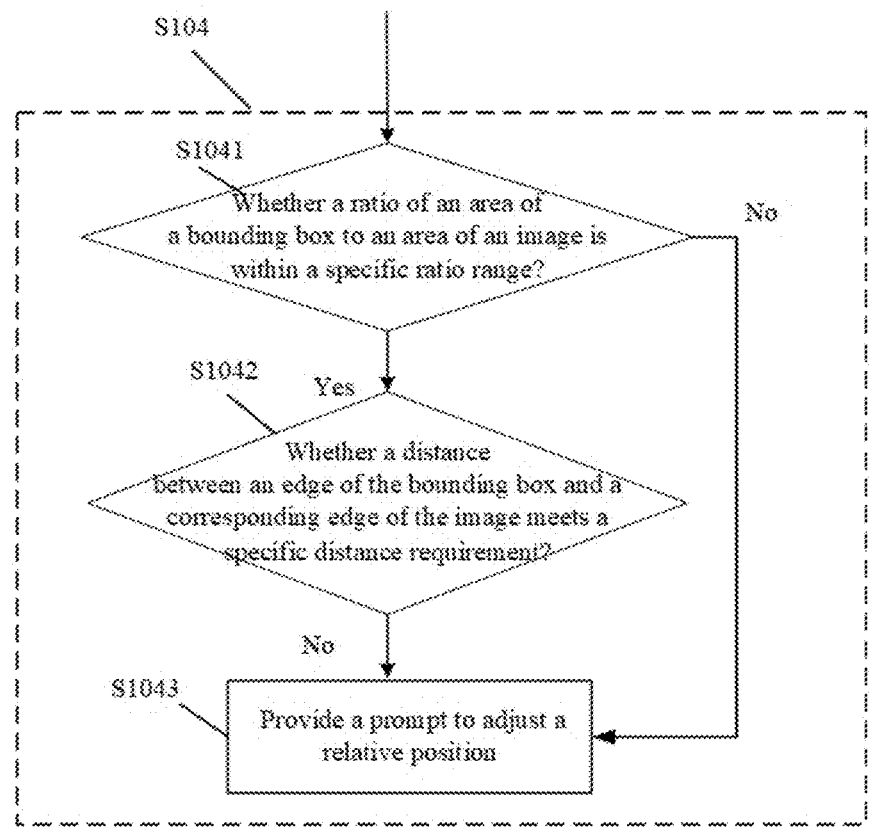

According to some embodiments, as shown in FIG. 11E, providing, in response to the geometric relationship between the at least a portion of the target object and the image satisfying the specific condition, the prompt to adjust the relative position between the target object and the image sensor in step S104 may include:

step S1041: determining whether a ratio of an area of the bounding box to an area of the image is within a specific ratio range;

if it is determined that the ratio of the area of the bounding box to the area of the image is within the specific ratio range, proceeding to step S1042 to determine whether a distance between an edge of the bounding box and a corresponding edge of the image is within a specific distance range; and if it is determined that the distance between an edge of the bounding box and a corresponding edge of the image is not within the specific distance range, proceeding to step S1043 to provide the prompt to adjust the relative position between the target object and the image sensor.

In addition, if the ratio of the area of the bounding box to the area of the image is not within the specific ratio range, it is possible to proceed to step S1043 to provide the prompt to adjust the relative position between the target object and the image sensor.

In this implementation, the determination condition about the area ratio and the determination condition about the distance between an edge of the bounding box and an edge of the image are combined together in a converse order to determine whether the position and the size of the target object in the image are suitable.

Figure 11F:
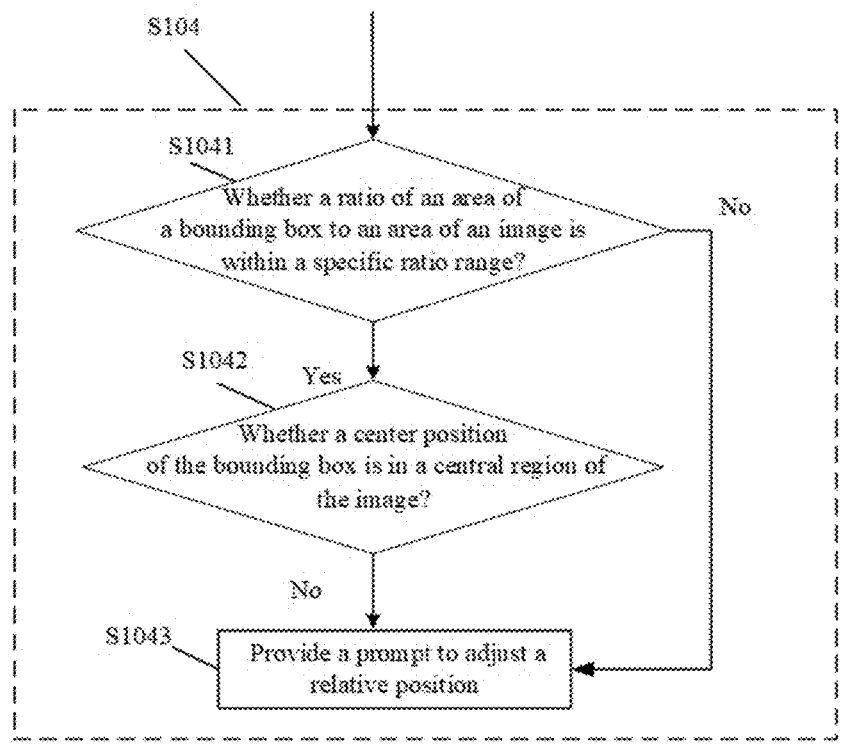

According to some embodiments, as shown in FIG. 11F, providing, in response to the geometric relationship between the at least a portion of the target object and the image satisfying the specific condition, the prompt to adjust the relative position between the target object and the image sensor in step S104 may include:

step S1041: determining whether a ratio of an area of the bounding box to an area of the image is within a specific ratio range;

if it is determined that the ratio of the area of the bounding box to the area of the image is within the specific ratio range, proceeding to step S1042 to determine whether a center position of the bounding box is in a central region of the image; and if it is determined that the center position of the bounding box is not in the central region of the image, proceeding to step S1043 to provide the prompt to adjust the relative position between the target object and the image sensor.

In addition, if the ratio of the area of the bounding box to the area of the image is not within the specific ratio range, it is possible to proceed to step S1043 to provide the prompt to adjust the relative position between the target object and the image sensor.

In this implementation, the determination condition about the area ratio and the determination condition about the center position of the bounding box are combined together in a converse order to determine whether the position of the target object in the image is suitable.

An implementation of combining three determination conditions will be illustrated below by way of example. By the determination way of combining more determination conditions, an image with a better quality can be obtained, a more accurate prompt can be automatically provided to the user, the processing time can be greatly shortened, the processing resources can be effectively reduced, and a better and more accurate service can be provided to the user.

Figure 12A:
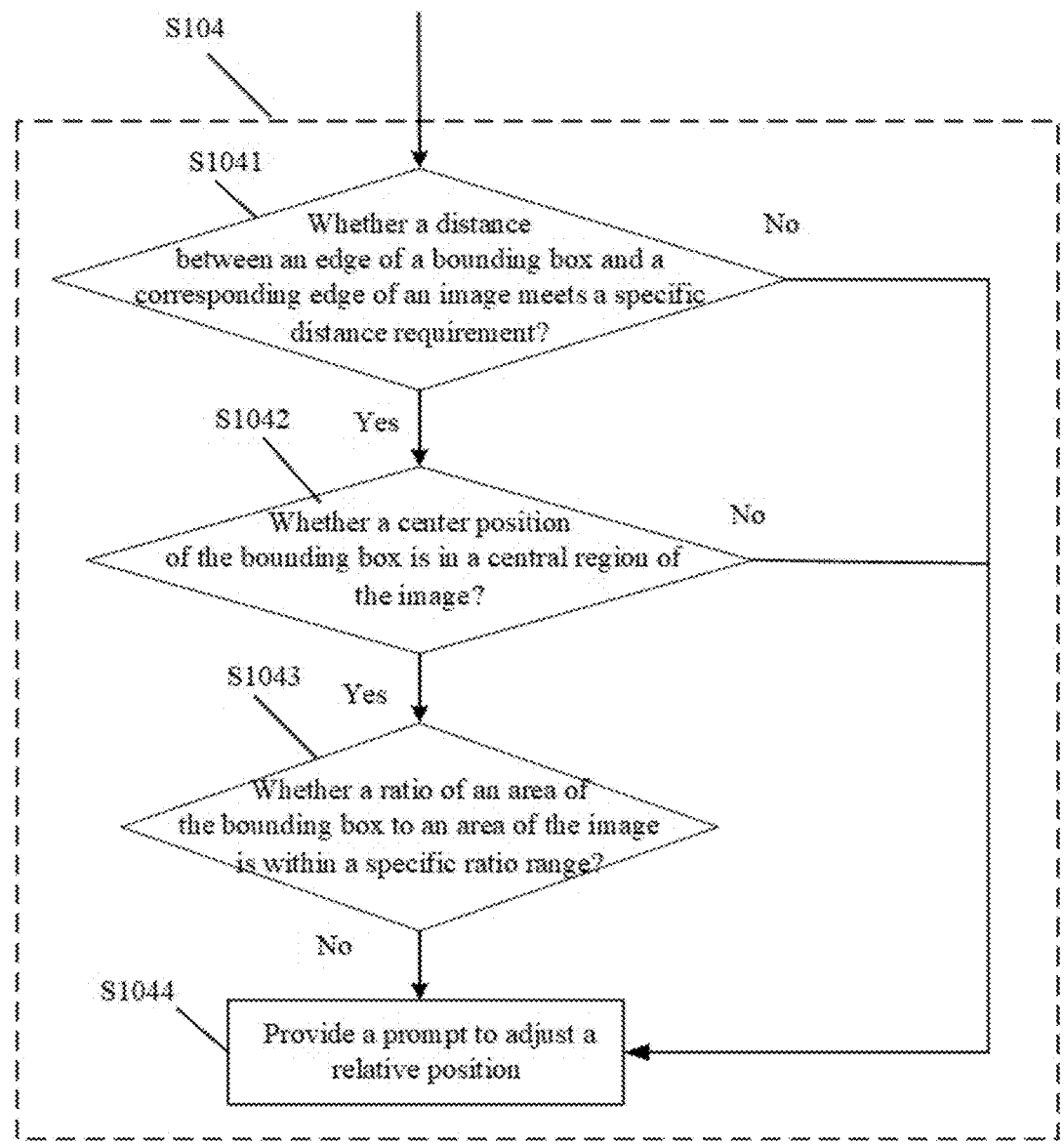
FIGS. 12A, 12B, and 12C show examples in which a determination is performed by combining three determination conditions.

According to some embodiments, as shown in FIG. 12A, providing, in response to the geometric relationship between the at least a portion of the target object and the image satisfying the specific condition, the prompt to adjust the relative position between the target object and the image sensor in step S104 may include:

step S1041: determining whether a distance between an edge of the bounding box and a corresponding edge of the image meets a specific distance requirement;

if the distance between an edge of the bounding box and a corresponding edge of the image meets the specific distance requirement, proceeding to step S1042 to determine whether a center position of the bounding box is in a central region of the image;

if it is determined that the center position of the bounding box is in the central region of the image, proceeding to step S1043 to determine whether a ratio of an area of the bounding box to an area of the image is within a specific distance range; and if it is determined that the ratio of the area of the bounding box to the area of the image is not within the specific ratio range, proceeding to step S1044 to provide the prompt to adjust the relative position between the target object and the image sensor.

In this implementation, the distance between the edges, the center position, and the area ratio are sequentially combined together to determine whether the position and the size of the target object in the image are suitable, so as to obtain a target object of which the position and the size are more suitable in the image.

Figure 12B:
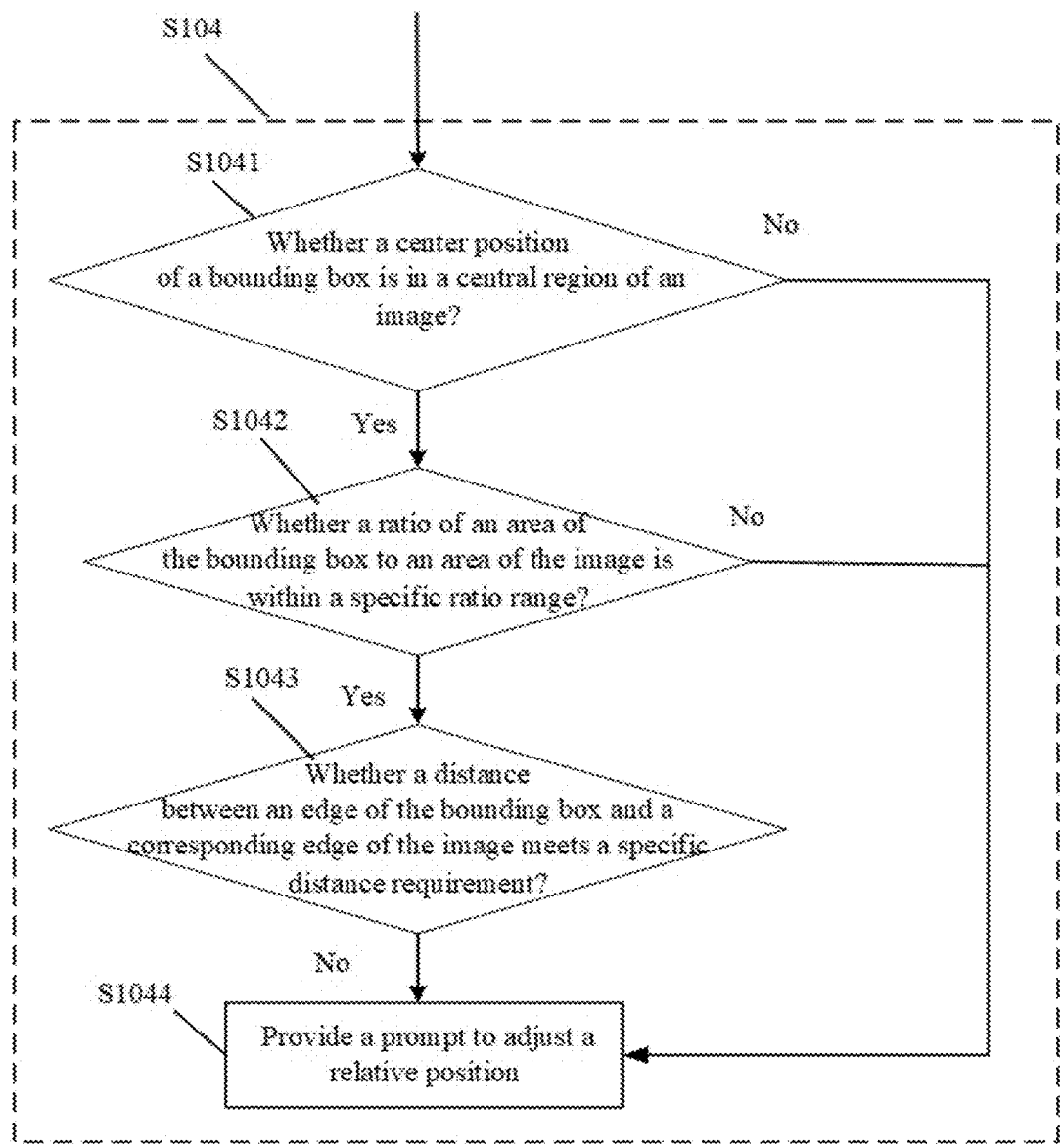

According to some embodiments, as shown in FIG. 12B, providing, in response to the geometric relationship between the at least a portion of the target object and the image satisfying the specific condition, the prompt to adjust the relative position between the target object and the image sensor in step S104 may include:

step S1041: determining whether a center position of the bounding box is in a central region of the image;

if the center position is in the central region, proceeding to step S1042 to determine whether a ratio of an area of the bounding box to an area of the image is within a specific distance range;

if the ratio of the area of the bounding box to the area of the image is within the specific distance range, proceeding to step S1043 to determine whether a distance between an edge of the bounding box and a corresponding edge of the image meets a specific distance requirement; and if the distance between an edge of the bounding box and the corresponding edge of the image does not meet the specific distance requirement, proceeding to step S1044 to provide the prompt to adjust the relative position between the target object and the image sensor.

In this implementation, the area ratio, the distance between the edges, and the center position are sequentially combined together to likewise determine whether the position and the size of the target object in the image are suitable, so as to obtain a target object of which the position and the size are more suitable in the image.

Figure 12C:
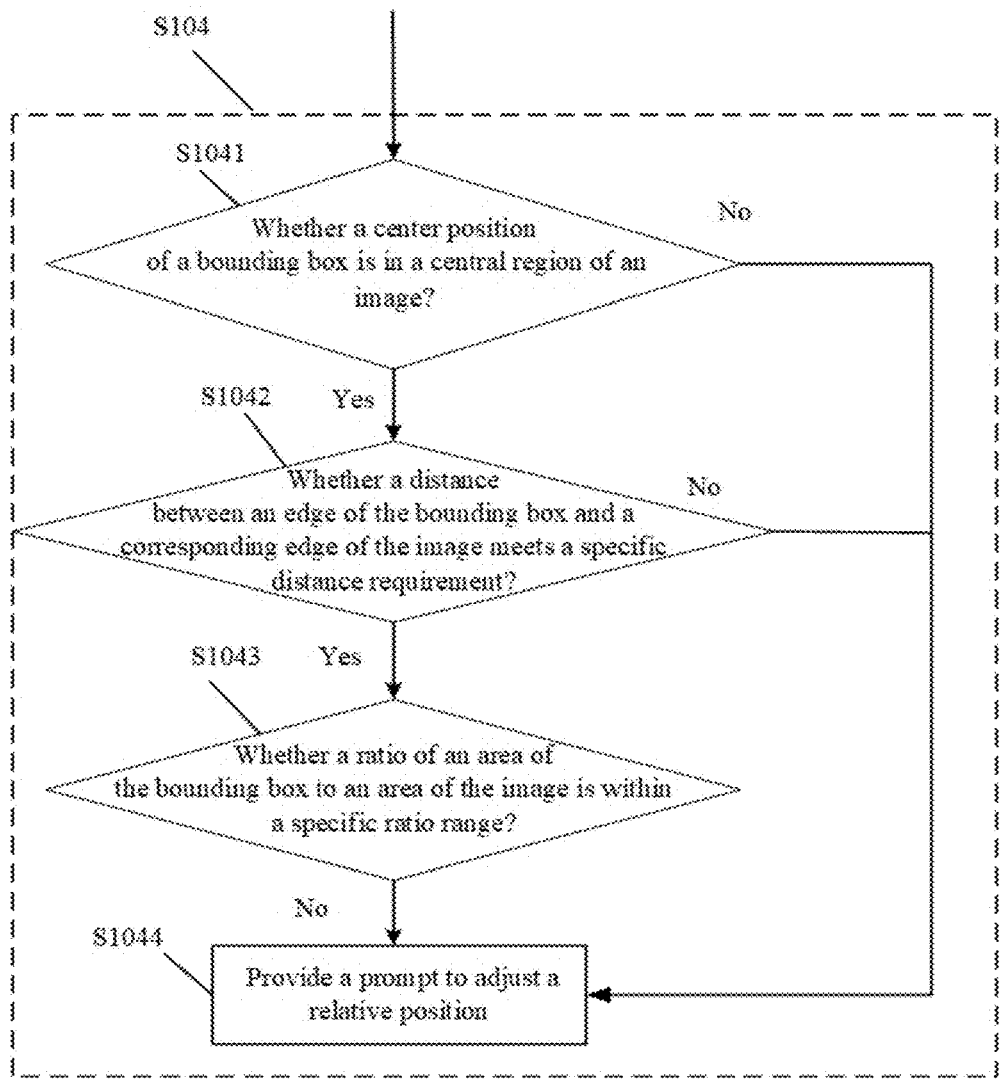

According to some embodiments, as shown in FIG. 12C, providing, in response to the geometric relationship between the at least a portion of the target object and the image satisfying the specific condition, the prompt to adjust the relative position between the target object and the image sensor in step S104 may include:

step S1041: determining whether a center position of the bounding box is in a central region of the image;

if it is determined that the center position is in the central region of the image, proceeding to step S1042 to determine whether a ratio of an area of the bounding box to an area of the image is within a specific ratio range;

if it is determined that the ratio of the area of the bounding box to the area of the image is within the specific ratio range, proceeding to step S1043 to determine whether a distance between an edge of the bounding box and the corresponding edge of the image meets the specific distance requirement; and if it is determined that the distance between an edge of the bounding box and the corresponding edge of the image does not meet the specific distance requirement, proceeding to step S1044 to provide the prompt to adjust the relative position between the target object and the image sensor.

In this implementation, the center, the area ratio, and the distance between the edges are sequentially combined together to likewise determine whether the position and the size of the target object in the image are suitable, so as to obtain a target object of which the position and the size are more suitable in the image. Moreover, this combination makes it possible to relatively quickly obtain a target object having both a suitable position and size in the image.

In addition, as described above, the determination condition about the inclination angle of the text line may also be combined with other conditions, which will be briefly described below in connection with an example.

Figure 12D:
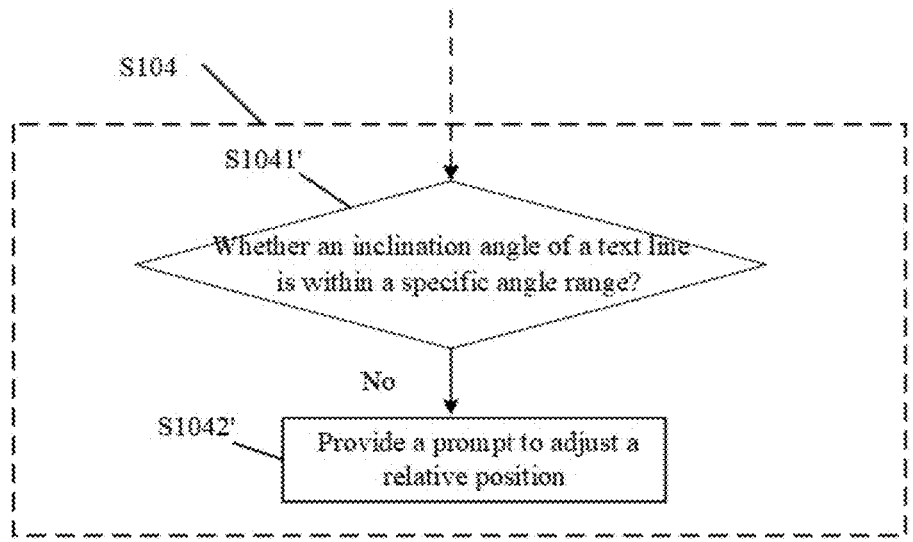
FIG. 12D shows an example in which a determination is performed based on an angle of a text line.

As shown in FIG. 12D, providing, in response to the geometric relationship between the at least a portion of the target object and the image satisfying the specific condition, the prompt to adjust the relative position between the target object and the image sensor may further include:

when the target object includes a text region, in step S1041', determining whether an angle of a text line of the text region of the target object relative to an edge of the image is within a specific angle range; and if the angle of the text line of the text region of the target object relative to the edge of the image is not within the specific angle range, prompting the user to adjust the relative angle between the target object and the image sensor in step S1042'.

As mentioned above, the specific angle range may be, for example, [−30°, 30], and the relative angle may include, for example, two parameters: the rotation angle and the rotation direction.

This implementation gives an example of determining, by means of an inclination angle of a text line, whether the position of a target object in an image is suitable, which can also be combined with at least one of, for example, the center position, the area ratio, and the distance between the edges, as described above, to determine whether the position and/or the size of the target object in the image are suitable. Therefore, in addition to steps S1041' and S1042', FIG. 11D may include those steps shown in FIGS. 10A to 10F and FIGS. 11A to 11C mentioned above. In other words, steps S1041' and S1042' may be combined with the steps in FIGS. 10A to 10F and FIGS. 11A to 11C, respectively. The description will not be described here due to the limitation of the length of the text.

The combinations of the determination conditions are not limited to those exemplified above, and as described above, the determination conditions are not limited to the several conditions described above. With regard to the determination conditions and combinations thereof, the present disclosure exemplifies enough examples to make the present disclosure easier to understand. Moreover, the present disclosure should include not only these illustrated implementations, but also various substitutions, variations, and extensions.

Step S104 is described in detail above, and other steps are further described below.

As mentioned above, after providing the prompt to adjust the target object to be within the field of view of the image sensor in step S103, as shown in FIG. 1, it is possible to proceed to step S101 to reacquire an image re-collected by the image sensor and continue to detect whether there is at least a portion of the target object in the reacquired image in step S102 until at least a portion of the target object is detected in the reacquired image.

Moreover, after providing the prompt to adjust the relative position between the target object and the image sensor in step S104, as shown in FIG. 1, it is also possible to proceed to step S101 to reacquire an image re-collected by the image sensor and continue to perform operations such as steps S102, S104 based on the reacquired image until at least a portion of the target object is detected in the reacquired image, and it is determined that the geometric relationship between the detected at least a portion of the target object and the reacquired image no longer satisfies the specific condition regarding that the prompt to adjust the relative position between the target object and the image sensor needs to be provided, or satisfies a condition regarding that there is no need to provide the prompt to adjust the relative position between the target object and the image sensor (that is, the size and/or position, etc. of the target object in the image have been relatively suitable, and the prompt to adjust the relative position between the target object and the image sensor no longer needs to be provided).

In other words, in the case where the target object cannot be detected or the size and/or the position, etc. of the detected target object in the image are not suitable, an image may be re-collected, so as to detect whether the target object exists in the re-collected image and whether the size and/or the position of the existing target object are suitable, and so on.

In addition, according to some embodiments, the number of times and/or timing of re-collections, detections, and prompts may be controlled. For example, a detection stopping instruction may be initiated actively (artificially) by the user. Alternatively, a device such as a processor may automatically initiate a detection stopping instruction on its own, for example, a continuous acquisition of images may be stopped, a continuous detection thereof may be stopped, the generation of a prompt because a bounding box or a complete bounding box cannot be detected or the relative position between a target object and an image sensor is continuously unsuitable may be stopped, based on the number of times of detections, the time period for which the bounding box cannot be detected continuously, etc., thereby preventing too centralized and frequent prompts, so that a service satisfying needs may be provided to the user.

According to some embodiments, the image sensor may re-collect an image after at least a specific time interval (such as 2 s), such that there is sufficient time to move the target object and/or the image sensor according to a prompt, so as to prevent an image from being collected too frequently in the event that the relative position between the target object and the image sensor has not been prepared.

An implementation that causes an image to be re-collected by the image sensor at a specific time interval may use, for example, interval-based collection, that is, collection is performed at a fixed time interval, for example, by pressing a shutter every two seconds, and such an interval-based collection way can be set in some image sensors.

Figure 13:
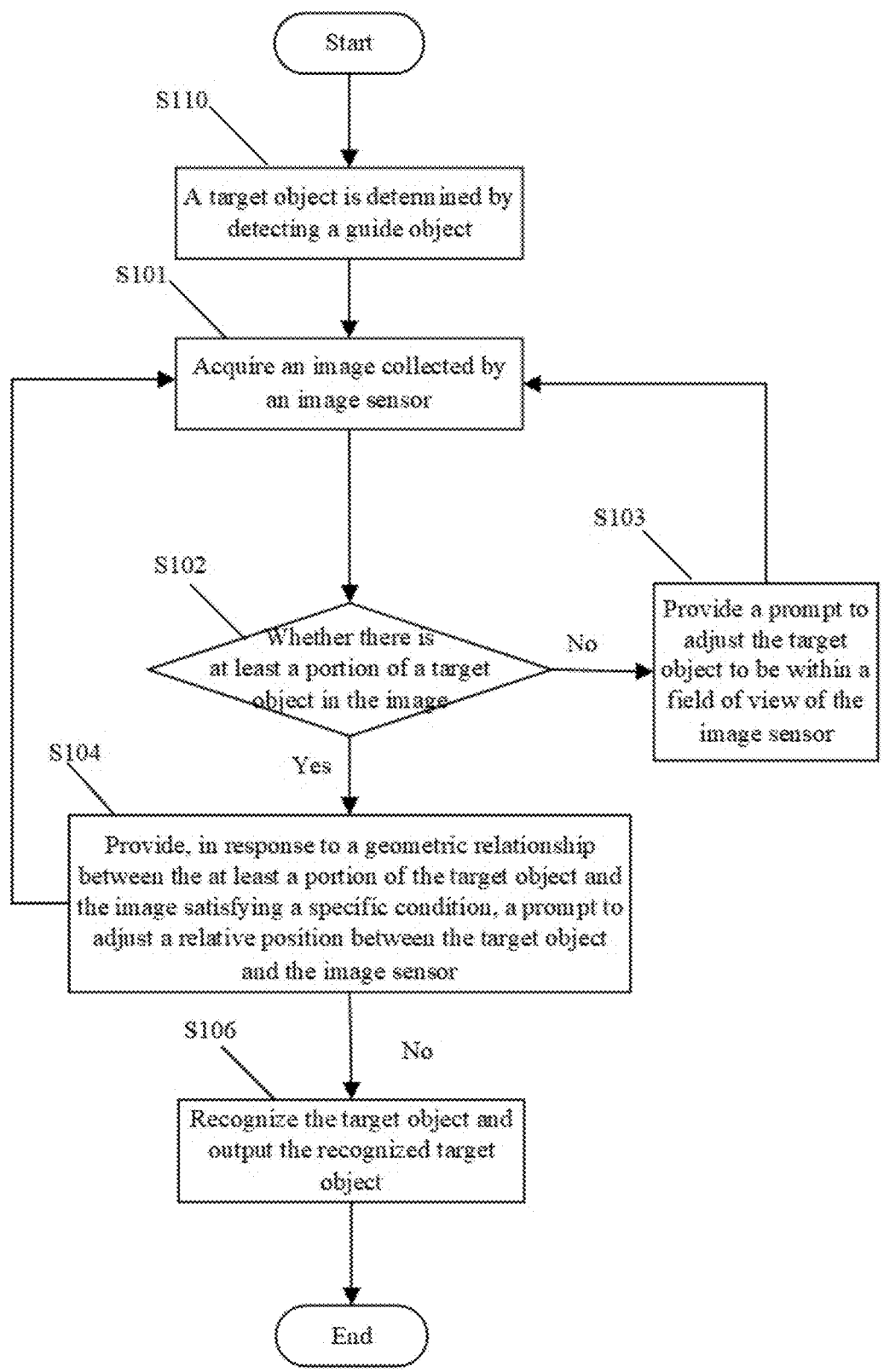
FIG. 13 is a flow chart showing a target detection method according to another exemplary embodiment of the present disclosure.

According to some embodiments, as shown in FIG. 13, before the image sensor collects an image, in step S110, a target object to be collected is determined by detecting a guide object, such that the target object is determined before the collection, to prevent a plurality of suspect target objects from appearing in the image, which makes subsequent detection and recognition difficult.

According to some embodiments, the guide object may be, for example, a finger of the user.

Here, the finger may be detected and the position of the finger may be determined using, for example, a computer vision algorithm. For example, an algorithm from OpenCV, such as the CascadeClassifier function (see https://docs.opencv.org/3.2.0/d1/de5/classcv_1_1CascadeClassifier.html), may be used to determine the position of the finger from the image, thereby confirming the target object.

In addition, the guide object is not limited to a finger, and may also be, for example, a pen.

According to some embodiments, in the case where a plurality of suspect target objects are detected in the image but the target object is not confirmed, the user may also be prompted, in the form of a text or sound prompt, to confirm the target object to be collected.

In addition, according to some embodiments, as shown in FIG. 13, the target detection method of the present disclosure may further include: step S106: recognizing the target object in the image and outputting the recognized target object. For example, in response to detecting at least a portion of the target object in the image, and determining that the geometric relationship between the detected at least a portion of the target object and the image does not satisfy the specific condition regarding that the prompt to adjust the relative position between the target object and the image sensor needs to be provided, or satisfies the condition regarding that there is no need to provide the prompt to adjust the relative position between the target object and the image sensor (that is, the size and/or position, etc. of the target object in the image are relatively suitable, and there is no need to provide the prompt to adjust the relative position between the target object and the image sensor), the target object in the image may be recognized and the recognized target object may be output.

According to some embodiments, in a scenario where the user is prompted to move the target object, as described above, the target object may be a movable target object, for example, an ID card, a business card, a passport, a driver's license, a reading material (a media reading material or an electronic reading material), a tablet computer, a mobile phone, etc.

According to some embodiments, recognizing the target object in the image may include recognizing text in the target object, and accordingly, outputting the recognized target object may include outputting the text in the recognized target object.

According to some embodiments, the form of the output includes an output in a sound form and/or an output in a text form, etc.

For example, in the case where a visually impaired user or a user wearing a wearable device that does not provide a preview image cannot determine the image quality, in an exemplary implementation of the present disclosure, an image with a better quality is obtained by automatically helping the user to determine the image quality in advance and further automatically prompting the user, so as to improve the accuracy and speed of target recognition, thereby effectively saving the processing resources and greatly shortening the processing time, and helping the user to more quickly obtain a desired service (for example, a reading service, a guide service, etc.).

According to some embodiments, an image sensor may first collect a preview image so as to detect a target object based on the preview image, and then photograph an image for recognition (that is, a capture image) after detecting a bounding box of the target object or detecting a complete bounding box of the target object, wherein the resolution of the preview image is less than that of the image for recognition.

In this way, by using a low-resolution image during detection and using a high-resolution image during recognition, low-resolution images are collected before capturing the target object with a suitable position and/or size, thereby greatly saving the limited processing resources, whereas a high-resolution image is used during real recognition, thereby ensuring the recognition effect.

According to some embodiments, before the image sensor performs collection or confirms that the relative position between the target object and the image sensor is suitable such that the target object is to be photographed, it is also possible to provide a prompt to hold the target object so that the user maintains the position of the target object, or if the user needs to hold or support the target object, the user can prepare in advance to hold or support the target object more stably such that a clear image can be photographed.

According to some embodiments, the prompts described above may include one of a sound prompt, a vibration prompt, a text prompt, an image prompt, and a video prompt, or any combination thereof. That is, the present disclosure is not limited to a certain prompt form, but a variety of forms can be combined for prompting.

Prompting by vibration, for example, making a prompt to get less close or closer, may be performed in different modes of vibration. For example, a short vibration mode means that it needs to be placed closer, a long and slow vibration mode indicates that it needs to be placed farther away, and so on. In addition, for example, for making a prompt regarding the direction of movement by vibration, vibration in a corresponding direction may be used to indicate that the movement should be performed in this direction. Vibration prompts are very convenient for hearing impaired persons who cannot hear normal sound.

The target detection method of the present disclosure is described above in connection with the accompanying drawings. In the case where a preview image is not provided or the preview image is not visible, the present disclosure proposes to first detect whether there is at least a portion of a target object in an image collected by an image sensor, and then in the case where at least a portion of the target object is not detected, to provide a prompt to adjust the target object to be within a field of view of the image sensor, or if at least a portion of the target object is detected, to provide a prompt to adjust the relative position between the target object and the image sensor based on position information of the target object in the collected image, so as to more conveniently adjust the position of the target object and/or the image sensor, thereby allowing the image sensor to more quickly collect the target object having a suitable position and/or size.

In this way, for example, in the case where a visually impaired user or a user wearing a wearable device that does not provide a preview image cannot determine the image quality, in an exemplary implementation of the present disclosure, an image with a better quality is obtained by automatically helping the user to determine the image quality in advance and further automatically prompting the user, so as to improve the accuracy and speed of target recognition, thereby effectively saving the processing resources and greatly shortening the processing time, and helping the user to more quickly obtain a desired service (for example, a reading service, a guide service, etc.).

According to another aspect of the present disclosure, an electronic circuit is further provided, which may include: a circuit configured to perform the steps of the method described above.

According to another aspect of the present disclosure, a device for assisting visually impaired people is further provided, including: an image sensor configured to collect an image; and the above-mentioned electronic circuit, which is, for example, configured to detect whether there is at least a portion of a target object in the image, and provide, in response to not detecting at least a portion of the target object in the image, a prompt to adjust the target object to be within a field of view of the image sensor.

According to some embodiments, the electronic circuit may be, for example, further configured to provide, in response to the image sensor being a device with a fixed position, a prompt to move the target object to bring the target object into the field of view of the image sensor; and to provide, in response to the image sensor being a device with an adjustable position, a prompt to move the target object and/or the image sensor to bring the target object into the field of view of the image sensor.

According to some embodiments, the device for assisting visually impaired people may include one or more of: a device for assisting visually impaired people (such as a reading assisting device) connectable to a wearable device (for example, glasses, a helmet, etc.), a hand-held device for assisting visually impaired people, a desktop device for assisting visually impaired people, etc.

According to some embodiments, the device for assisting visually impaired people may be installed on a corresponding support, such as a desktop support, to serve as a desktop device for assisting visually impaired people. In other words, the device for assisting visually impaired people may further include a corresponding support.

Figure 14A:
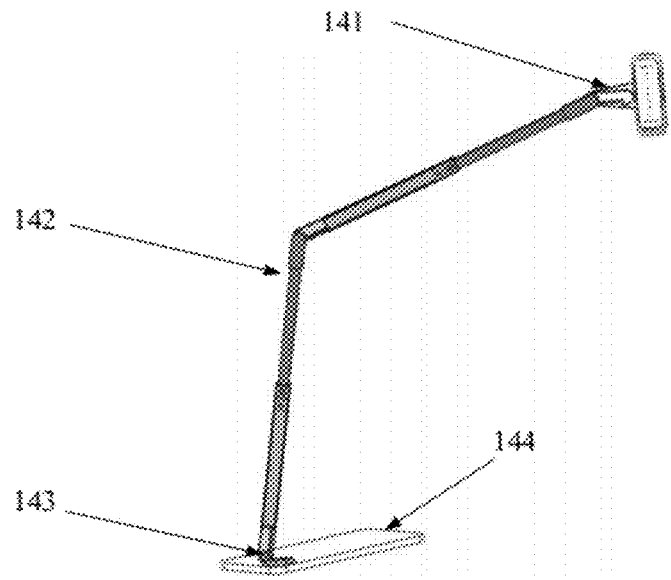
FIGS. 14A and 14B show structural block diagrams of supports such as desktop supports, in an unfolded state and a folded state respectively, for a device for assisting visually impaired people according to an exemplary embodiment of the present disclosure.
Figure 14B:
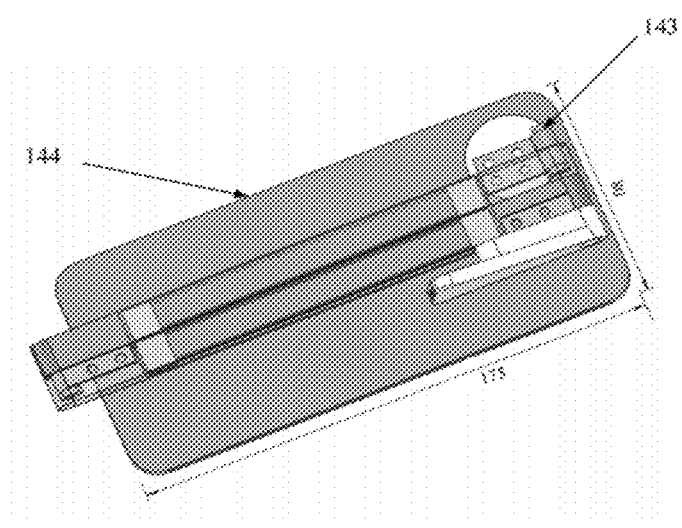

For example, FIGS. 14A and 14B show structural block diagrams of supports such as desktop supports, in an unfolded state and a folded state respectively, for a device for assisting visually impaired people according to an exemplary embodiment of the present disclosure. As can be seen from FIG. 14A, the support may include a connector 141, a telescopic stand arm 142, a rotary base joint 143, and a counterweighted base 144.

The connector 141 is configured to install (for example, install through absorption) the image sensor and the electronic circuit. According to some embodiments, the connector 141 may include a magnet, which is formed on a surface of the connector 141 (for example, the desktop-facing surface of the connector 141 when the support is stably placed on the desktop in an unfolded state) in an embedded manner for installing the image sensor and the electronic circuit on the connector 141 through absorption.

The telescopic stand arm 142 has one end connected to the connector 141 and the other end connected to the counterweighted base 144 via the rotary base joint 143, and is configured to support the connector 141 and adjust the position (including the height, the angle, etc.) of the connector 141 relative to the counterweighted base 144 or the desktop by way of telescoping and/or rotating. According to some embodiments, the telescopic stand arm 142 may include a plurality of telescopic sections connected to each other, for example, four telescopic sections as shown in FIG. 14A, and certainly, another number of the telescopic sections may also be included according to actual requirements. The length of at least one of the plurality of telescopic sections is adjustable. In addition, the bottom telescopic section connected to the rotary base joint 143 in the plurality of telescopic sections is adjustable in position relative to the counterweighted base 144 (for example, the bottom telescopic sections can be rotated within a specified angle range relative to the counterweighted base 144, and the specified angle range may be, for example, 0° to 90° with limits included). The other telescopic sections may be socketed to the previous telescopic sections to which they are connected, or may be adjustable in position relative to the previous telescopic sections to which they are connected (for example, the other telescopic sections can be rotated within a specified angle range relative to the previous telescopic sections, and the specified angle range may be, for example, 0° to 90° with limits included).

The counterweighted base 144 is configured to support other assemblies of the support, such as the connector 141 and the telescopic stand arm 142, so that the support can be stably placed on the desktop when in an unfolded state (or an operating state). For example, when the assemblies of the support are in the state shown in FIG. 14A, the counterweighted base 144 can enable the support to be placed on the desktop stably. According to some embodiments, as shown in FIG. 14B, the counterweighted base 144 may has a cross section in an approximately rectangular shape with four arc-shaped ends, wherein the size of the long side of the rectangle may be 150 mm to 180 mm, such as 175 mm shown in the figure, and the size of the short side of the rectangle may be 60 mm to 90 mm, such as 80 mm shown in the figure. Certainly, the counterweighted base 144 may also has a cross section provided in other shapes, such as a circle, an ellipse, etc., depending on actual requirements.

According to some embodiments, as shown in FIGS. 14A and 14B, the rotary base joint 143 may be located at an edge of a side of the counterweighted base 144, and thus when the support is in the unfolded state, the counterweighted base may have a better support function, and when the support is in a folded state, the volume may be further reduced, thereby enhancing the user experience.

A possible structure of the support such as a desktop support that can be used for the device for assisting visually impaired people is schematically illustrated above with reference to FIGS. 14A and 14B. It should be noted that the structure shown in FIGS. 14A and 14B is merely an example, and according to a specific implementation, the support in the present disclosure may include only one or more of the components shown in FIG. 14A or 14B, or may further include other components.

According to some embodiments, the device for assisting visually impaired people may further include: a circuit configured to perform text detection and recognition on text included in the image so as to obtain text data; a circuit configured to convert the text data into sound data; and a circuit configured to output the sound data and/or the text data, etc.

According to another aspect of the present disclosure, an electronic device is further provided, including: a processor; and a memory that stores a program, the program including instructions that, when executed by the processor, cause the processor to perform the methods described above.

According to another aspect of the present disclosure, a non-transitory computer-readable storage medium that stores a program is further provided, the program including instructions that, when executed by a processor of an electronic device, cause the electronic device to perform the method described above.

Figure 15:
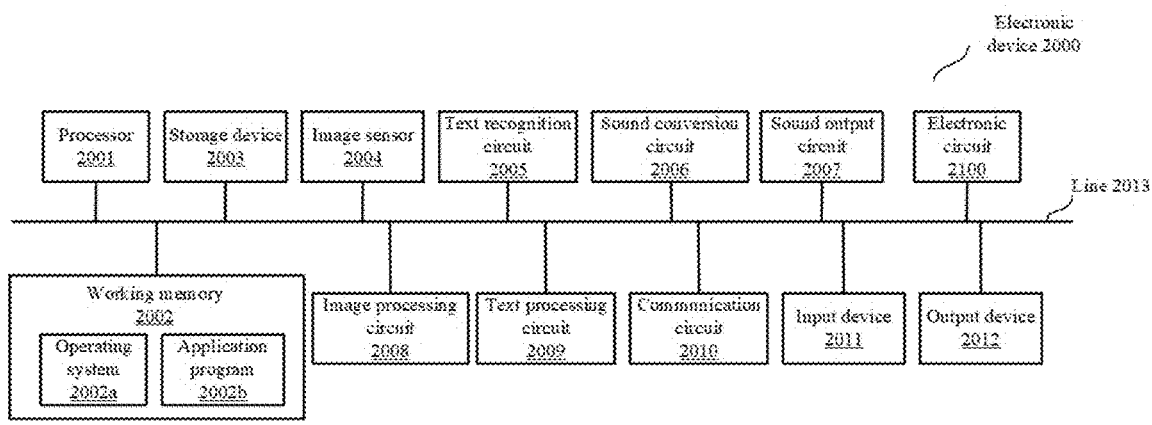
FIG. 15 is a structural block diagram showing an electronic device according to an exemplary embodiment of the present disclosure.

FIG. 15 is a block diagram showing an example of an electronic device according to an exemplary embodiment of the present disclosure. It should be noted that the structure shown in FIG. 15 is merely an example, and according to a specific implementation, the electronic device in the present disclosure may include only one or more of components shown in FIG. 15.

The electronic device 2000 may be, for example, a general-purpose computer (for example, various computers such as a laptop computer and a tablet computer), a mobile phone, or a personal digital assistant. According to some embodiments, the electronic device 2000 may be a device for assisting visually impaired people.

The electronic device 2000 may be configured to collect or photograph an image, process the collected (for example, preview) image, and provide a prompt in response to the processing. For example, the electronic device 2000 may be configured to collect an image, perform text detection and recognition on the image to obtain text data, convert the text data into sound data, and may output the sound data for the user to listen and/or output the text data to the user to view.

According to some implementations, the electronic device 2000 may be configured to include an eyeglass frame or configured to be detachably installed on an eyeglass frame (for example, a rim of the eyeglass frame, a connector that connects two rims, an eyeglass leg, or any other parts) so that an image that almost includes the field of view of the user can be collected or photographed.

According to some implementations, the electronic device 2000 may also be installed on another wearable device, or may be integrated with another wearable device. The wearable device may be, for example: a head-mounted device (for example, a helmet or a hat), a device that can be worn on ears, etc. According to some embodiments, the electronic device may be implemented as accessories attached to a wearable device, for example, accessories attached to the helmet or the hat, etc.

According to some implementations, the electronic device 2000 may also have other forms. For example, the electronic device 2000 may be a mobile phone, a general-purpose computing device (for example, a laptop computer, a tablet computer, etc.), a personal digital assistant, etc. The electronic device 2000 may also have a base so that the electronic device can be placed on a desktop.

According to some implementations, as a device for assisting visually impaired people, the electronic device 2000 may be used for assisting in reading, and the electronic device 2000 in this case is sometimes also referred to as an "e-reader" or a "reading assisting device". By means of the electronic device 2000, a user who cannot read autonomously (for example, a visually impaired person, a person with a reading disorder, etc.) can implement "reading" of a conventional reading material (for example, a book, a magazine, etc.) in a posture similar to a reading posture. In the "reading" process, the electronic device 2000 may acquire a collected image and detect the image, determine whether there is a bounding box surrounding the reading material in the image to confirm whether the reading material is collected in the image, and if it is determined that there is the bounding box, but the size or position of the collected reading material is not suitable, the electronic device may prompt the user to move the reading material based on the position of the bounding box in the image so as to photograph the reading material with a suitable size and position, and perform text detection and text recognition on the photographed reading material with a suitable size and position (for example, using an optical character recognition OCR method) so as to obtain text data therein, and may convert the text data into sound data and output the sound data through a sound output device such as a speaker or a headphone for the user to listen.

By providing a user with various detailed prompts to move a target object in the case where a preview image is not provided or an image cannot be previewed, it is possible to help the electronic device 2000 to acquire a target object with a suitable position and size more quickly and more accurately, thereby causing the target object to be recognized and output to the user more quickly and more accurately, and greatly improving the response speed, the recognition efficiency, and the recognition accuracy.

The electronic device 2000 may include an image sensor 2004 for collecting, photographing, and acquiring images. The image sensor 2004 may collect and/or photograph a static image or may collect and/or photograph a dynamic image, which may include, but is not limited to, a webcam, a camera, a video camera, etc., and is configured to acquire an initial image including a target object. The electronic device 2000 may further include an electronic circuit 2100, and the electronic circuit 2100 includes a circuit configured to perform the steps of the method described above. The electronic device 2000 may further include a text recognition circuit 2005, and the text recognition circuit 2005 is configured to perform text detection and recognition (for example, OCR processing) on texts in the image so as to obtain text data. The text recognition circuit 2005 may be implemented, for example, by a dedicated chip. The electronic device 2000 may further include a sound conversion circuit 2006, and the sound conversion circuit 2006 is configured to convert the text data into sound data. The sound conversion circuit 2006 may be implemented, for example, by a dedicated chip. The electronic device 2000 may further include a sound output circuit 2007, and the sound output circuit 2007 is configured to output the sound data. The sound output circuit 2007 may include, but is not limited to a headphone, a loudspeaker, or a vibrator, etc., and its corresponding drive circuit.

According to some implementations, the electronic device 2000 may further include an image processing circuit 2008, and the image processing circuit 2008 may include a circuit configured to perform various image processing on an image. The image processing circuit 2008 may include, for example, but is not limited to, one or more of: a circuit configured to perform denoising on an image, a circuit configured to perform defuzzification on an image, a circuit configured to perform geometric correction on an image, a circuit configured to perform feature extraction on an image, a circuit configured to perform target detection and recognition on a target object in an image, a circuit configured to perform text detection on a text contained in an image, a circuit configured to extract a text line from an image, a circuit configured to extract text coordinates from an image, a circuit configured to extract a bounding box from an image, a circuit configured to extract a text box from an image, a circuit configured to perform layout analysis (for example, paragraph division) based on an image, etc.

According to some implementations, the electronic circuit 2100 may further include a text processing circuit 2009, and the text processing circuit 2009 may be configured to perform various processing based on extracted text-related information (for example, text data, a text box, paragraph coordinates, text line coordinates, and text coordinates) so as to obtain processing results, such as paragraph sorting, text semantic analysis, and layout analysis results.

One or more of the above-mentioned various circuits (for example, the text recognition circuit 2005, the sound conversion circuit 2006, the sound output circuit 2007, the image processing circuit 2008, the text processing circuit 2009, and the electronic circuit 2100) may be implemented by using custom hardware, and/or hardware, software, firmware, middleware, microcodes, hardware description languages, or any combination thereof. For example, one or more of the circuits mentioned above may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in consistent with the present disclosure.

According to some implementations, the electronic device 2000 may further include a communication circuit 2010. The communication circuit 2010 may be any type of device or system that enables communication with an external device and/or a network, and may include, but is not limited to, a modem, a network card, an infrared communication device, a wireless communication device and/or a chipset, such as a Bluetooth device, a 1302.11 device, a WiFi device, a WiMax device, a cellular communication device, and/or the like.

According to some implementations, the electronic device 2000 may further include an input device 2011. The input device 2011 may be any type of device capable of inputting information to the electronic device 2000, and may include, but is not limited to, various sensors, a mouse, a keyboard, a touch screen, a button, a joystick, a microphone and/or a remote controller, etc.

According to some implementations, the electronic device 2000 may further include an output device 2012. The output device 2012 may be any type of device capable of presenting information, and may include, but is not limited to, a display, a visual output terminal, a vibrator and/or a printer, etc. Although the electronic device 2000 is used for a device for assisting visually impaired people according to some embodiments, a vision-based output device may facilitate a family member of the user, a maintenance staff, etc. in obtaining output information from the electronic device 2000.

According to some implementations, the electronic device 2000 may further include a processor 2001. The processor 2001 may be any type of processor and may include, but is not limited to, one or more general purpose processors and/or one or more dedicated processors (for example, special processing chips). The processor 2001 may be, for example, but is not limited to, a central processing unit (CPU) or a microprocessor unit (MPU). The electronic device 2000 may further include a working memory 2002. The working memory 2002 may be a working memory that stores programs (including instructions) and/or data (for example, an image, characters, a voice, and other intermediate data) useful to the working of the processor 2001, and may include, but is not limited to, a random access memory and/or read-only memory device. The electronic device 2000 may further include a storage device 2003. The storage device 2003 may include any non-transitory storage device. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or codes. The working memory 2002 and the storage device 2003 may be collectively referred to as "memories", and may be interchangeably used in some cases.

According to some implementations, the processor 2001 may control and schedule at least one of the image sensor 2004, the text recognition circuit 2005, the sound conversion circuit 2006, the sound output circuit 2007, the image processing circuit 2008, the text processing circuit 2009, the communication circuit 2010, the electronic circuit 2100, and other various apparatuses and circuits included in the electronic device 2000. According to some implementations, at least some of the components described in FIG. 15 may be interconnected and/or communicate with each other through a line 2013.

Software elements (programs) may be located in the working memory 2002, and may include, but is not limited to, an operating system 2002a, one or more application programs 2002b, drivers, and/or other data and codes.

According to some implementations, the instructions for the above-mentioned control and scheduling may be included in the operating system 2002a or the one or more application programs 2002b.

According to some implementations, the instructions for performing the method steps described in the present disclosure may be included in the one or more application programs 2002*b*, and the above-mentioned modules of the electronic device 2000 may be implemented by the processor 2001 reading and executing the instructions of the one or more application programs 2002*b*. In other words, the electronic device 2000 may include the processor 2001 and a memory (for example, the working memory 2002 and/or the storage device 2003) that stores a program, the program including instructions that, when executed by the processor 2001, cause the processor 2001 to carry out the method of various embodiments of the present disclosure.

According to some implementations, some or all of the operations performed by at least one of the text recognition circuit 2005, the sound conversion circuit 2006, the image processing circuit 2008, the text processing circuit 2009, and the electronic circuit 2100 may be implemented by the processor 2001 reading and executing the instructions of the one or more application programs 2002*b*.

Executable codes or source codes of the instructions of the software elements (programs) may be stored in a non-transitory computer-readable storage medium (for example, the storage device 2003), and may be stored in the working memory 2002 when executed (may be compiled and/or installed). Therefore, the present disclosure provides a computer-readable storage medium storing a program, the program including instructions that, when executed by a processor of an electronic device (for example, a device for assisting visually impaired people), cause the electronic device to carry out the method of various embodiments of the present disclosure. According to another implementation, the executable codes or source codes of the instructions of the software elements (programs) may also be downloaded from a remote position.

It should also be appreciated that various variations may be made according to specific requirements. For example, custom hardware may also be used, and/or various circuits, units, modules, or elements may be implemented in hardware, software, firmware, middleware, microcodes, hardware description languages, or any combination thereof. For example, some or all of the circuits, units, modules, or elements included in the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in consistent with the present disclosure.

According to some implementations, the processor 2001 in the electronic device 2000 may be distributed over a network. For example, some processing may be executed by one processor while other processing may be executed by another processor away from the one processor. Other modules of the electronic device 2000 may also be similarly distributed. As such, the electronic device 2000 can be interpreted as a distributed computing system that performs processing at a plurality of positions.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended granted claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A computer-implemented target detection method, comprising:
   acquiring an image collected by an image sensor;
   detecting whether there is at least a portion of a target object in the image;
   providing, in response to not detecting at least a portion of the target object in the image, a prompt to adjust the target object to be within a field of view of the image sensor; and
   determining, in response to detecting at least a portion of the target object in the image, whether a geometric relationship between the at least a portion of the target object and the image satisfies a specific condition; and
   providing, in response to the geometric relationship between the at least a portion of the target object and the image satisfying the specific condition, a prompt to adjust a relative position between the target object and the image sensor.

2. The target detection method according to claim 1, further comprising:
   after providing the prompt to adjust the target object to be within the field of view of the image sensor, reacquiring an image and continuing to detect whether there is at least a portion of the target object in the reacquired image until at least a portion of the target object is detected in the reacquired image.

3. The target detection method according to claim 2, wherein the reacquired image is an image re-collected by the image sensor, and wherein the image sensor re-collects an image after at least a specific time interval.

4. The target detection method according to claim 1, wherein providing the prompt to adjust the target object to be within the field of view of the image sensor comprises:
   providing, in response to the image sensor being a device with a fixed position, a prompt to move the target object to bring the target object into the field of view of the image sensor; and
   providing, in response to the image sensor being a device with an adjustable position, a prompt to move the target object and/or the image sensor to bring the target object into the field of view of the image sensor.

5. The target detection method according to claim 1, wherein the at least a portion of the target object is represented by a corresponding bounding box detected in the image, and wherein providing, in response to the geometric relationship between the at least a portion of the target object and the image satisfying the specific condition, the prompt to adjust the relative position between the target object and the image sensor comprises:
   providing, in response to a distance between an edge of the bounding box and a corresponding edge of the image not meeting a specific distance requirement, the prompt to adjust the relative position between the target object and the image sensor.

6. The target detection method according to claim 5, wherein the bounding box is a rectangular box, and the specific distance requirement comprises a distance between each edge of the rectangular box and a corresponding edge of the image being greater than a corresponding specific distance threshold; and wherein providing, in response to the distance between an edge of the bounding box and a corresponding edge of the image not meeting the specific distance requirement, the prompt to adjust the relative position between the target object and the image sensor comprises:
- directly making, in response to detecting that the distance between each edge of the rectangular box and the corresponding edge of the image is less than the corresponding specific distance threshold, a prompt to cause the target object to get less close; and
- making, in response to detecting that three or fewer of four distances between edges of the rectangular box and corresponding edges of the image are less than corresponding specific distance thresholds, a prompt to cause the target object to get less close, and/or to move the target object towards an orientation that is opposite to an orientation of a center position of the bounding box relative to a center position or a central region of the image.

7. The target detection method according to claim 5, wherein the bounding box is a rectangular box, and the specific distance requirement further comprises the distance between an edge of the bounding box and a corresponding edge of the image being within a corresponding specific distance range; and wherein providing, in response to the distance between an edge of the bounding box and a corresponding edge of the image not meeting the specific distance requirement, the prompt to adjust the relative position between the target object and the image sensor comprises:
- making, in response to at least one of distances between edges of the bounding box and corresponding edges of the image being less than a lower limit of the corresponding specific distance range, a prompt to cause the target object to get less close and/or to cause the target object to be shifted in a direction opposite to an orientation of an edge of the bounding box that is at a distance less than the lower limit of the corresponding specific distance range from a corresponding edge of the image; and
- making, in response to at least one of the distances between the edges of the bounding box and the corresponding edges of the image being greater than an upper limit of the corresponding specific distance range, a prompt to cause the target object to get closer and/or to cause the target object to be shifted in a direction consistent with an orientation of an edge of the bounding box that is at a distance greater than the upper limit of the corresponding specific distance range from a corresponding edge of the image.

8. The target detection method according to claim 1, wherein the at least a portion of the target object is represented by a corresponding bounding box detected in the image, and wherein providing, in response to the geometric relationship between the at least a portion of the target object and the image satisfying the specific condition, the prompt to adjust the relative position between the target object and the image sensor comprises:
- providing, in response to a center position of the bounding box being not in a central region of the image, the prompt to adjust the relative position between the target object and the image sensor.

9. The target detection method according to claim 8, wherein providing, in response to the center position of the bounding box being not in the central region of the image, the prompt to adjust the relative position between the target object and the image sensor comprises:
- making, based on an orientation of the center position of the bounding box relative to the central region of the image, a prompt to move the target object in a direction opposite to the orientation.

10. The target detection method according to claim 1, wherein the at least a portion of the target object is represented by a corresponding bounding box detected in the image, and wherein providing, in response to the geometric relationship between the at least a portion of the target object and the image satisfying the specific condition, the prompt to adjust the relative position between the target object and the image sensor comprises:
- providing, in response to a ratio of an area of the bounding box to an area of the image being not within a specific ratio range, the prompt to adjust the relative position between the target object and the image sensor.

11. The target detection method according to claim 10, wherein providing, in response to the ratio of the area of the bounding box to the area of the image being not within the specific ratio range, the prompt to adjust the relative position between the target object and the image sensor comprises:
- making, in response to the ratio of the area of the bounding box to the area of the image being greater than an upper limit of the specific ratio range, a prompt to cause the target object to get less close; and
- making, in response to the ratio of the area of the bounding box to the area of the image being less than a lower limit of the specific ratio range, a prompt to cause the target object to get closer.

12. The target detection method according to claim 1, wherein the target object comprises a text region, and wherein providing, in response to the geometric relationship between the at least a portion of the target object and the image satisfying the specific condition, the prompt to adjust the relative position between the target object and the image sensor comprises:
- determining whether an angle of a text line of the text region of the target object relative to an edge of the image is within a specific angle range, and making, in response to the angle being not within the specific angle range, a prompt to adjust a relative angle between the target object and the image sensor.

13. The target detection method according to claim 1, wherein the acquired image is a preview image collected by the image sensor, and wherein a resolution of the preview image is less than that of a capture image collected by the image sensor.

14. A device for assisting visually impaired people, comprising:
- an image sensor configured to collect an image; and
- an electronic circuit configured to detect whether there is at least a portion of a target object in the image,
- wherein the electronic circuit is further configured to:
  - provide, in response to not detecting at least a portion of the target object in the image, a prompt to adjust the target object to be within a field of view of the image sensor; and
  - determine, in response to detecting at least a portion of the target object in the image, whether a geometric relationship between the at least a portion of the target object and the image satisfies a specific condition, and
  - provide, in response to the geometric relationship between the at least a portion of the target object and the image satisfying the specific condition, a prompt to adjust a relative position between the target object and the image sensor.

15. The device according to claim 14, wherein the electronic circuit is configured to:
provide, in response to the image sensor being a device with a fixed position, a prompt to move the target object to bring the target object into the field of view of the image sensor; and
provide, in response to the image sensor being a device with an adjustable position, a prompt to move the target object and/or the image sensor to bring the target object into the field of view of the image sensor.

16. The device according to claim 14, comprising one or more of:
a device for assisting visually impaired people that is connectable to a wearable device, a hand-held device for assisting visually impaired people, and a desktop device for assisting visually impaired people.

17. The device according to claim 14, further comprising a support, the support comprising a connector, a telescopic stand arm, and a counterweighted base for supporting the connector and the telescopic stand arm, wherein
the connector is configured to install the image sensor and the electronic circuit; and
the telescopic stand arm has one end connected to the connector and the other end connected to the counterweighted base via a rotary base joint, and is configured to support the connector and adjust a position of the connector relative to the counterweighted base by way of telescoping and/or rotating.

18. A non-transitory computer-readable storage medium that stores a program, the program comprising instructions that, when executed by a processor of an electronic device, cause the electronic device to perform operations of:
acquiring an image collected by an image sensor;
detecting whether there is at least a portion of a target object in the image;
providing, in response to not detecting at least a portion of the target object in the image, a prompt to adjust the target object to be within a field of view of the image sensor; and
determining, in response to detecting at least a portion of the target object in the image, whether a geometric relationship between the at least a portion of the target object and the image satisfies a specific condition; and
providing, in response to the geometric relationship between the at least a portion of the target object and the image satisfying the specific condition, a prompt to adjust a relative position between the target object and the image sensor.

19. The non-transitory computer-readable storage medium according to claim 18, wherein the instructions, when executed by the processor, further cause the electronic device to perform operations of:
providing, in response to the image sensor being a device with a fixed position, a prompt to move the target object to bring the target object into the field of view of the image sensor; and
providing, in response to the image sensor being a device with an adjustable position, a prompt to move the target object and/or the image sensor to bring the target object into the field of view of the image sensor.

* * * * *